(12) United States Patent
Wiley et al.

(10) Patent No.: US 9,520,988 B1
(45) Date of Patent: Dec. 13, 2016

(54) ADAPTATION TO 3-PHASE SIGNAL SWAP WITHIN A TRIO

(71) Applicant: QUALCOMM Incorporated, San Diego, CA (US)

(72) Inventors: George Alan Wiley, San Diego, CA (US); Ohjoon Kwon, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/817,934

(22) Filed: Aug. 4, 2015

(51) Int. Cl.
*H04L 7/00* (2006.01)
*H04L 27/20* (2006.01)
*H04L 27/227* (2006.01)
*H04B 1/40* (2015.01)

(52) U.S. Cl.
CPC .............. *H04L 7/0087* (2013.01); *H04B 1/40* (2013.01); *H04L 27/20* (2013.01); *H04L 27/227* (2013.01)

(58) Field of Classification Search
CPC ..... H04B 10/6933; H04B 10/695; H04B 1/30; H04B 1/1036; H04L 25/061; H04L 25/062; H04L 25/063; H04L 25/06; H04L 25/03038; H04L 27/2647; H04L 2025/03414; H04L 25/03057
USPC ................. 375/219–228, 259–352, 354–376
See application file for complete search history.

(56) References Cited

U.S. PATENT DOCUMENTS

| 4,562,425 | A | * | 12/1985 | Turner | .................. | H04L 27/362 341/51 |
|---|---|---|---|---|---|---|
| 5,259,002 | A | * | 11/1993 | Carlstedt | .................. | H03M 5/06 375/258 |
| 6,701,140 | B1 | * | 3/2004 | Stine | ...................... | H03L 7/0992 375/327 |
| 7,885,367 | B2 | * | 2/2011 | Nishimura | .............. | H04L 7/048 327/144 |
| 8,064,535 | B2 | * | 11/2011 | Wiley | ........................ | H04L 5/20 341/58 |
| 8,472,551 | B2 | * | 6/2013 | Wiley | ........................ | H04L 5/20 341/58 |
| 8,649,460 | B2 | * | 2/2014 | Ware | ........................ | H03M 5/16 375/268 |
| 8,848,810 | B2 | * | 9/2014 | Lee | .......................... | H04L 25/49 370/258 |
| 9,112,815 | B2 | * | 8/2015 | Wiley | .................... | H04L 47/745 |
| 9,231,790 | B2 | * | 1/2016 | Wiley | ........................ | H04L 5/20 |
| 9,246,713 | B2 | * | 1/2016 | Shokrollahi | ............ | H04L 17/18 |

(Continued)

*Primary Examiner* — James M Perez
(74) *Attorney, Agent, or Firm* — Loza & Loza, LLP

(57) ABSTRACT

Systems, methods and apparatus are described that facilitate transmission of data, particularly between two devices within an electronic apparatus. Two Integrated Circuit (IC) devices may be collocated in an electronic apparatus and communicatively coupled through a 3-wire, 3-phase interface. A data transfer method operational on a first of the two or more devices includes determining presence of a misalignment of the 3-wire communication link involving two or more wires, and inverting a first bit of a 3-bit symbol encoded in a transition of signaling state of the 3-wire communication link when the misalignment of the 3-wire communication link is determined to affect phase relationships between two or more signals carried on the three wires, such that inverting the first bit corrects the phase relationships between the two or more signals. A version of the 3-phase signal may be communicated in a different phase state through each of three wires.

27 Claims, 19 Drawing Sheets

(56) References Cited

U.S. PATENT DOCUMENTS

| | | | |
|---|---|---|---|
| 2005/0204057 A1* | 9/2005 | Anderson | H04L 29/06027 709/236 |
| 2007/0160155 A1* | 7/2007 | Choi | H04L 25/085 375/257 |
| 2007/0164883 A1* | 7/2007 | Furtner | G06F 13/4295 341/126 |
| 2008/0212709 A1* | 9/2008 | Wiley | H04L 5/20 375/286 |
| 2010/0215118 A1* | 8/2010 | Ware | H03M 5/16 375/295 |
| 2013/0241759 A1* | 9/2013 | Wiley | H04L 25/0272 341/173 |
| 2014/0247834 A1 | 9/2014 | Poulsen | |
| 2014/0254712 A1 | 9/2014 | Lee et al. | |
| 2015/0043358 A1* | 2/2015 | Wiley | H04L 1/0014 370/242 |
| 2015/0098536 A1* | 4/2015 | Sengoku | H04L 5/0053 375/355 |
| 2015/0271037 A1* | 9/2015 | Wiley | H04B 3/462 370/252 |
| 2016/0226734 A1* | 8/2016 | Pandey | H04B 3/00 |

\* cited by examiner

| Perm. | Wire Order | +x | -x | +y | -y | +z | -z | CW Order preserved? |
|---|---|---|---|---|---|---|---|---|
| 0 | A B C | +x | -x | +y | -y | +z | -z | Yes |
| 1 | A C B | -z | +z | -y | +y | -x | +x | No |
| 2 | B A C | -x | +x | -z | +z | -y | +y | No |
| 3 | B C A | +y | -y | +z | -z | +x | -x | Yes |
| 4 | C A B | +z | -z | +x | -x | +y | -y | Yes |
| 5 | C B A | -y | +y | -x | +x | -z | +z | No |

FIG. 11

ADAPTATION TO 3-PHASE SIGNAL SWAP WITHIN A TRIO

BACKGROUND

Field

At least one aspect generally relates to high-speed data communications interfaces, and more particularly, configuring the input and output pins of an application processor.

Background

Manufacturers of mobile devices, such as cellular phones, may obtain components of the mobile devices from various sources, including different manufacturers. For example, the application processor in a cellular phone may be obtained from a first manufacturer, while the display for the cellular phone may be obtained from a second manufacturer. Moreover, multiple standards are defined for interconnecting certain components of the mobile devices. For example, there are multiple types of interface defined for communications between an application processor and a display or camera within mobile device, including the Display System Interface (DSI) standard specified by the Mobile Industry Processor Interface (MIPI) Alliance.

The MIPI Alliance specifies the "C-PHY" standard, which provides high-speed data communication over a trio of wires. In some instances, it may be desirable to reconfigure the wiring between devices for ease of routing, for example. The additional hardware required to facilitate flexible routing can increase device complexity and cost.

SUMMARY

Embodiments disclosed herein provide systems, methods and apparatus that enable devices to accommodate wiring misalignments without the use of complex multiplexing and/or switching circuits. According to certain aspects described herein, two Integrated Circuit (IC) devices may be collocated in an electronic apparatus and communicatively coupled through one or more data links.

In an aspect of the disclosure, a data transfer method is operational on a first the two or more devices, where the two devices are configured for communicating using a 3-phase signal transmitted over a 3-wire communication link. The method may include determining presence of a misalignment of the 3-wire communication link involving two or more wires, and inverting a first bit of a 3-bit symbol corresponding to a transition of signaling state of the 3-wire communication link when the misalignment of the 3-wire communication link is determined to affect phase relationships between two or more signals carried on the 3-wire communication link. The 3-phase signal must be transmitted on all wires of the 3-wire communication link in different phases. Inverting the first bit may reverse an effect of the misalignment of the 3-wire communication link.

In an aspect of the disclosure, an apparatus includes means for transmitting a 3-phase signal on each of the three wires of a 3-wire communication link in different phases, including an encoder that encodes data in transitions of signaling state of the three wires, means for determining presence of a misalignment of the 3-wire interface involving two or more wires, and means for correcting phase relationships between two or more signals carried on the three wires, including logic configured to invert a first bit of a 3-bit symbol corresponding to a transition of signaling state of the 3-wire communication link when the misalignment of the 3-wire interface is determined to affect the phase relationships between the two or more signals.

In an aspect of the disclosure, an apparatus includes a communications interface configured to communicate data using a 3-phase signal transmitted in different phases on all three wires of a 3-wire communication link, correction logic configured to correct phase relationships between two or more signals carried on the 3-wire communication link, and a processing circuit. The processing circuit may be configured to determine presence of a misalignment of the 3-wire communication link and cause the correction logic to invert a first bit of a 3-bit symbol corresponding to a transition of signaling state of the 3-wire interface when a misalignment of the 3-wire communication link involving two or more wires is determined to affect the phase relationships between two or more signals carried on the 3-wire interface.

In an aspect of the disclosure, a processor-readable storage medium has one or more instructions stored thereon. The instructions may be executed by at least one processor of a processing circuit. The instructions may cause the processing circuit to determine presence of a misalignment of the 3-wire communication link involving two or more wires, invert a first bit of a 3-bit symbol corresponding to a transition of signaling state of the 3-wire communication link when the misalignment of the 3-wire communication link is determined to affect phase relationships between two or more signals carried on the 3-wire communication link. The 3-phase signal must be transmitted on all wires of the 3-wire communication link in different phases. Inverting the first bit reverses an effect of the misalignment of the 3-wire communication link.

BRIEF DESCRIPTION OF THE DRAWINGS

FIG. 11 illustrates a mapping of wire states of an unpermutated trio of wires to states occurring for different permutations of wire configuration.

DETAILED DESCRIPTION

Figure 1:
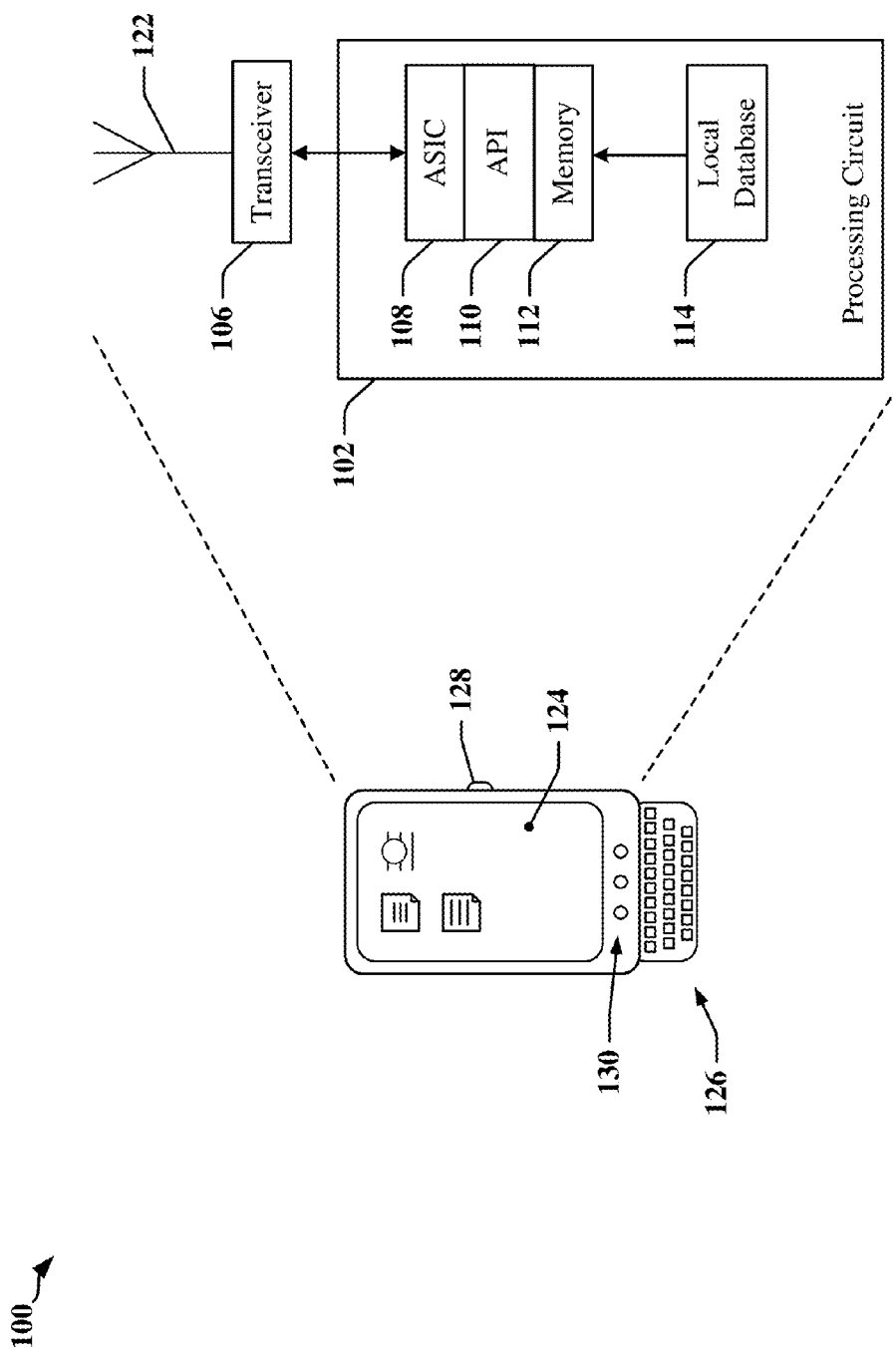
FIG. 1 depicts an apparatus employing a data link between IC devices that selectively operates according to one of a plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of data communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on, or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), Blu-Ray, and floppy disk where disks usually reproduce data magnetically, while discs reproduce data optically with lasers. Combinations of the above should also be included within the scope of computer-readable media.

FIG. 1 illustrates an apparatus 100 that may employ a communication link between IC devices. In one example, the apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory device 112 that can store and maintain data and instructions for execution or other use by the processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include ROM or RAM, EEPROM, flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit 102 may also be operably coupled to external devices such as an antenna 122, a display 124, operator controls, such as a button 128 and a keypad 126 among other components.

Figure 2:
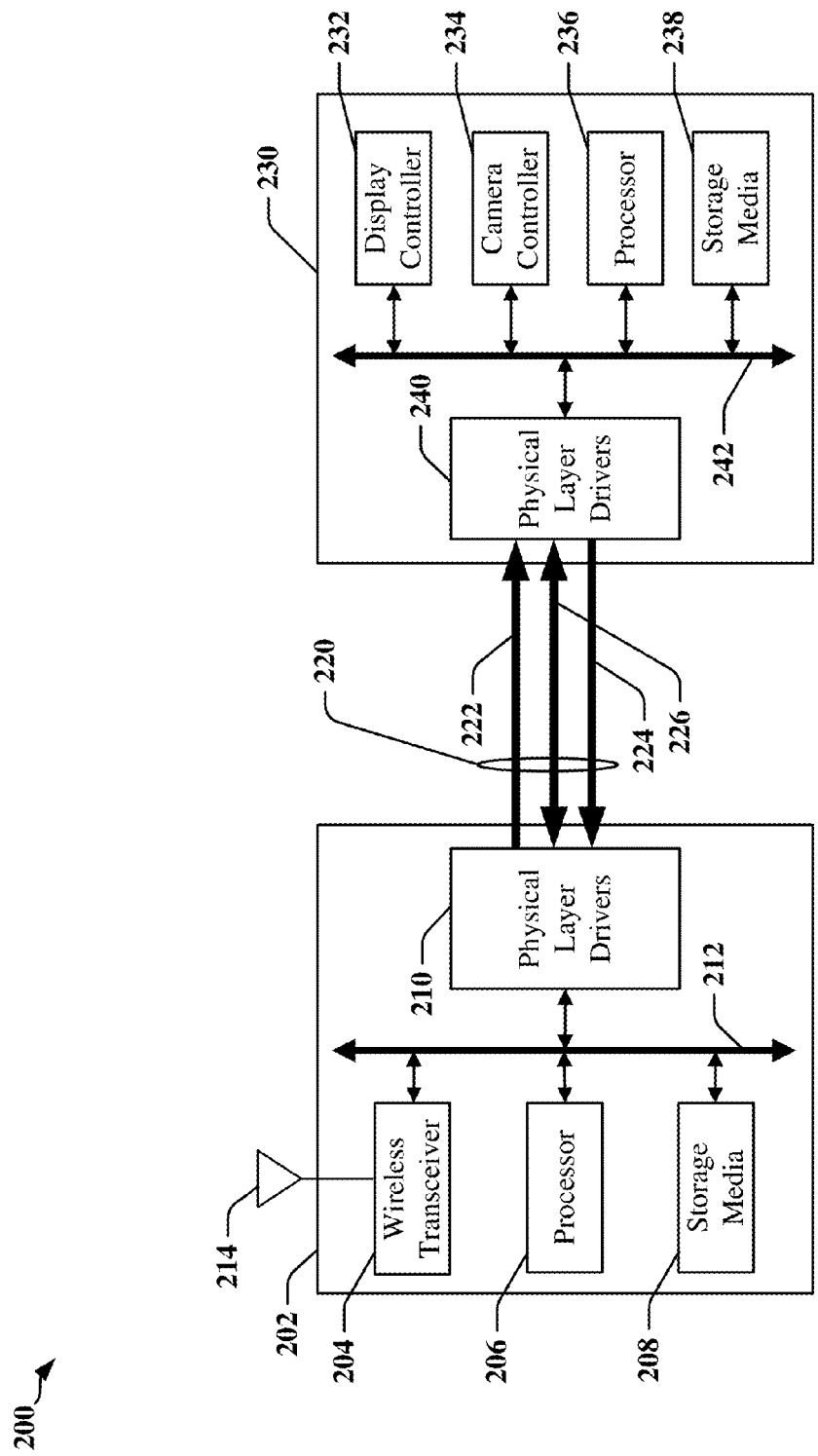
FIG. 2 illustrates a system architecture for an apparatus employing a data link between IC devices.

FIG. 2 is a block schematic diagram illustrating certain aspects of an apparatus 200 such as a mobile apparatus that employs a communication link 220 to connect various subcomponents. In one example, the apparatus 200 includes a plurality of IC devices 202 and 230 that exchange data and control information through the communication link 220. The communication link 220 may be used to connect IC devices 202 and 230 that are located in close proximity to one another, or physically located in different parts of the apparatus 200. In one example, the communication link 220 may be provided on a chip carrier, substrate or circuit board that carries the IC devices 202 and 230. In another example, a first IC device 202 may be located in a keypad section of a mobile computing device while a second IC device 230 may be located in a display section of mobile computing device. In another example, a portion of the communication link 220 may include a cable or optical connection.

The communication link 220 may provide multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first communication channel 222 may be referred to as a forward channel 222 while a second communication channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the communication link 220. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each have a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232. In the example, the second IC device 230 may be adapted to control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touchscreen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse channel 224 may be operated in the same manner as the forward channel 222, and the forward channel 222 and reverse channel 224 may be capable of transmitting at comparable speeds or at different speeds, where speed may be expressed as data transfer rate and/or clocking rates. The forward and reverse data transfer rates may be substantially the same or differ by orders of magnitude, depending on the application. In some applications, a single bidirectional channel 226 may support communications between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

In some instances, the forward and reverse channels 222 and 224 may be configured or adapted to support a wide video graphics array (WVGA) 80 frames per second LCD driver IC without a frame buffer, delivering pixel data at 810 Mbps for display refresh. In another example, the forward and reverse channels 222 and 224 may be configured or adapted to enable communications between with dynamic random access memory (DRAM), such as double data rate (DDR) synchronous DRAM (SDRAM). Encoding devices 210 and/or 230 may be configured to encode multiple bits per clock transition, and multiple sets of wires can be used to transmit and receive data from the SDRAM, control signals, address signals, and other signals.

The forward and reverse channels 222 and 224 may comply with, or be compatible with application-specific industry standards. In one example, the MIPI Alliance standard defines physical layer interfaces between an application processor IC device 202 and an IC device 230 that supports the camera or display in a mobile device. The MIPI Alliance standard includes specifications that govern the operational characteristics of products that comply with MIPI Alliance specifications for mobile devices. In some instances, the MIPI Alliance standard may define interfaces that employ complimentary metal-oxide-semiconductor (CMOS) parallel busses.

The MIPI Alliance defines standards and specifications that may address communications affecting all aspects of operations in a mobile device, including the antenna, peripherals, the modem and application processors. For example, the MIPI Alliance defines protocols for a camera serial interface (CSI) and a display serial interface (DSI). The MIPI Alliance CSI-2 specification defines a wired interface between a camera and Application Processor and the MIPI Alliance DSI or DSI-2 specification defines a wired interface between an Application Processor and a display. The low-level physical layer (PHY) interface in each of these applications can be the MIPI Alliance C-PHY or the MIPI Alliance D-PHY.

MIPI Alliance C-PHY Interface

According to certain aspects disclosed herein, certain systems and apparatus may employ multi-phase data encoding and decoding interface methods for communicating between IC devices 202 and 230. A multi-phase encoder may drive a plurality of conductors (i.e., M conductors). The M conductors typically include three or more conductors, and each conductor may be referred to as a wire, although the M conductors may include conductive traces on a circuit board or within a conductive layer of a semiconductor IC device. In one example, the C-PHY physical layer interface technology defined by the MIPI Alliance may be used to connect camera and display devices 230 to an application processor device 202. The C-PHY interface employs 3-phase symbol encoding to transmit data symbols on 3-wire lanes, or "trios" where each trio includes an embedded clock.

The M conductors may be divided into a plurality of transmission groups, each group encoding a portion of a block of data to be transmitted. An N-phase encoding scheme is defined in which bits of data are encoded in phase transitions and polarity changes on the M conductors. Decoding does not rely on independent conductors or pairs of conductors and timing information can be derived directly from phase and/or polarity transitions in the M conductors. N-Phase polarity data transfer can be applied to any physical signaling interface, including electrical, optical and radio frequency (RF) interfaces.

In the C-PHY example, a 3-phase encoding scheme for a 3-wire system may define three phase states and two polarities, providing 6 states and 5 possible transitions from each state. Deterministic voltage and/or current changes may be detected and decoded to extract data from the three wires.

Figure 3:
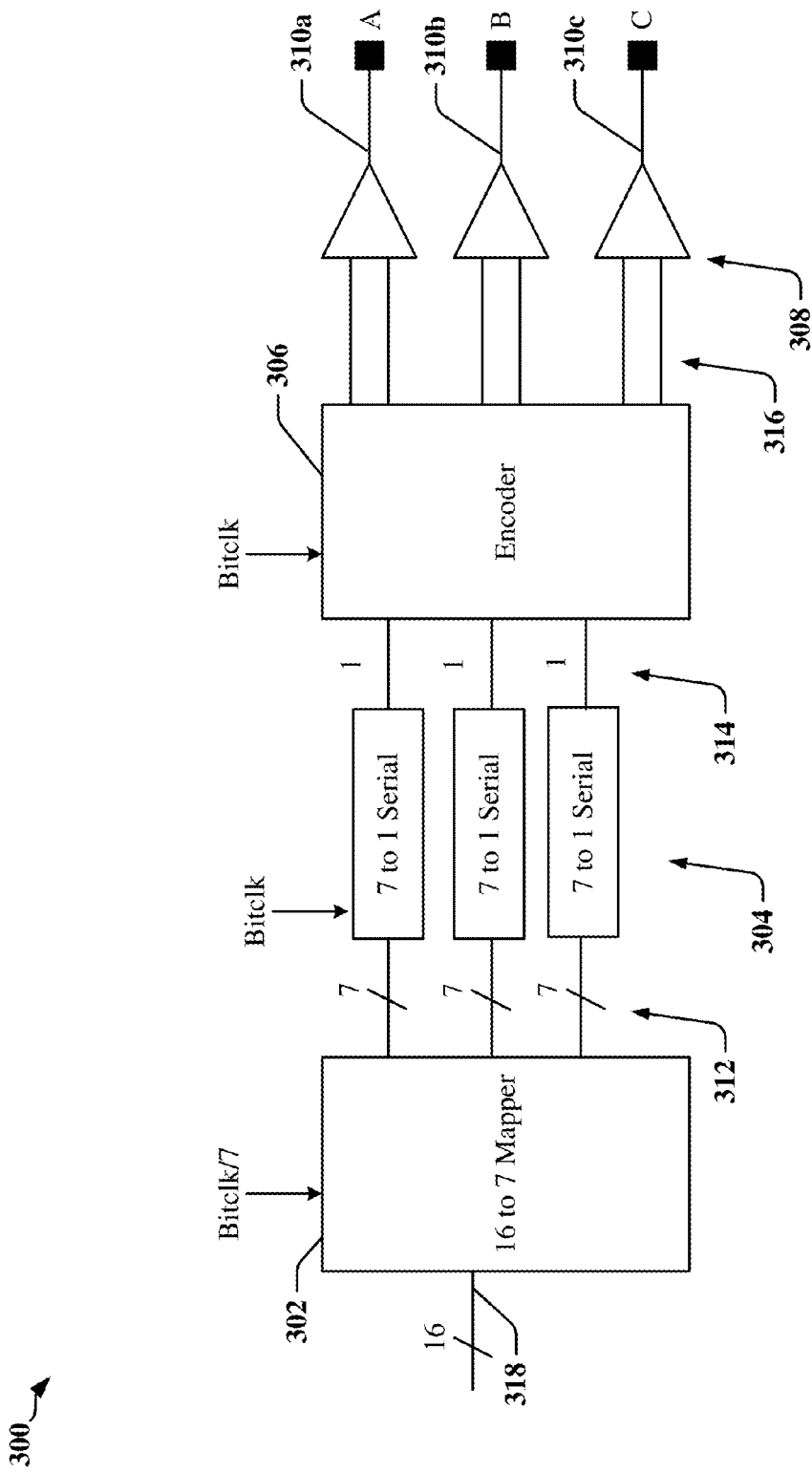
FIG. 3 illustrates an example of an N-phase polarity data encoder.

FIG. 3 is a schematic diagram illustrating the use of N-phase polarity encoding to implement certain aspects of the communication link 220 depicted in FIG. 2. The illustrated example may relate to a 3-wire link or to a 3-wire portion of a link that has more than three wires. The communication link 220 may include a wired bus having a plurality of signal wires, which may be configured to carry 3-phase encoded data in a high-speed digital interface, such as a mobile display digital interface (MDDI). One or more of the channels 222, 224 and 226 may be configured or adapted to use 3-phase polarity encoding. The physical layer drivers 210 and 240 may be adapted to encode and decode 3-phase polarity encoded data transmitted on the communication link 220. The use of 3-phase polarity encoding provides for high speed data transfer and may consume half or less of the power of other interfaces because fewer than 3 drivers are active in 3-phase polarity encoded communication links 220 at any time. 3-phase polarity encoding devices 210 and/or 240 can encode multiple bits per transition on the communication link 220. In one example, a combination of 3-phase encoding and polarity encoding may be used to support a wide video graphics array (WVGA), 80 frames per second LCD driver IC without a frame buffer, delivering pixel data for display refresh at 810 Mbps over three or more wires.

In the depicted C-PHY example 300, an M-wire, N-phase polarity encoding transmitter is configured for M=3 and N=3. The example of 3-wire, 3-phase encoding is selected solely for the purpose of simplifying descriptions of certain aspects of this disclosure. The principles and techniques disclosed for 3-wire, 3-phase encoders can be applied in other configurations of M-wire, N-phase polarity encoders, and may comply or be compatible with other interface standards.

When 3-phase polarity encoding is used, connectors such as signal wires 310a, 310b and 310c on a 3-wire bus may be undriven, driven positive, or driven negative. An undriven signal wire 310a, 310b or 310c may be in a high-impedance state. An undriven signal wire 310a, 310b or 310c may be driven or pulled to a voltage level that lies substantially halfway between the positive and negative voltage levels provided on driven signal wires. An undriven signal wire 310a, 310b or 310c may have no current flowing through it. In the example 300, each signal wire 310a, 310b and 310c may be in one of three states (denoted as +1, −1, or 0) using drivers 308. In one example, drivers 308 may include unit-level current-mode drivers. In another example, drivers 308 may drive opposite polarity voltages on two wires 310a and 310b while the third wire 310c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each symbol, the state of at least one signal wire 310a, 310b or 310c is changed from the symbol transmitted in the preceding transmission interval.

In the example, 300, a mapper 302 may receive 16 bit data 318, and the mapper 302 may map the input data 318 to 7 symbols 312 for transmitting sequentially over the signal wires 310a, 310b and 310c. An M-wire, N-phase encoder 306 configured for 3-wire, 3-phase encoding receives the 7 symbols 312 produced by the mapper one symbol 314 at a time and computes the state of each signal wire 310a, 310b and 310c for each symbol interval, based on the immediately preceding state of the signal wires 310a, 310b and 310c. The 7 symbols 312 may be serialized using parallel-to-serial converters 304, for example. The encoder 306 selects the states of the signal wires 310a, 310b and 310c based on the input symbol 314 and the previous states of signal wires 310a, 310b and 310c.

The use of M-wire, N-phase encoding permits a number of bits to be encoded in a plurality of symbols where the bits per symbol is not an integer. In the simple example of a 3-wire, 3-phase system, there are 3 available combinations of 2 wires, which may be driven simultaneously, and 2 possible combinations of polarity on any pair of wires that is driven simultaneously, yielding 6 possible states. Since each transition occurs from a current state, 5 of the 6 states are available at every transition. The state of at least one wire is typically required to change at each transition. With 5 states, log 2(5)=2.32 bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has 57 (78,125) permutations. Accordingly, the 7 symbols may be used to encode the $2^{16}$ (65,536) permutations of 16 bits.

Figure 4:
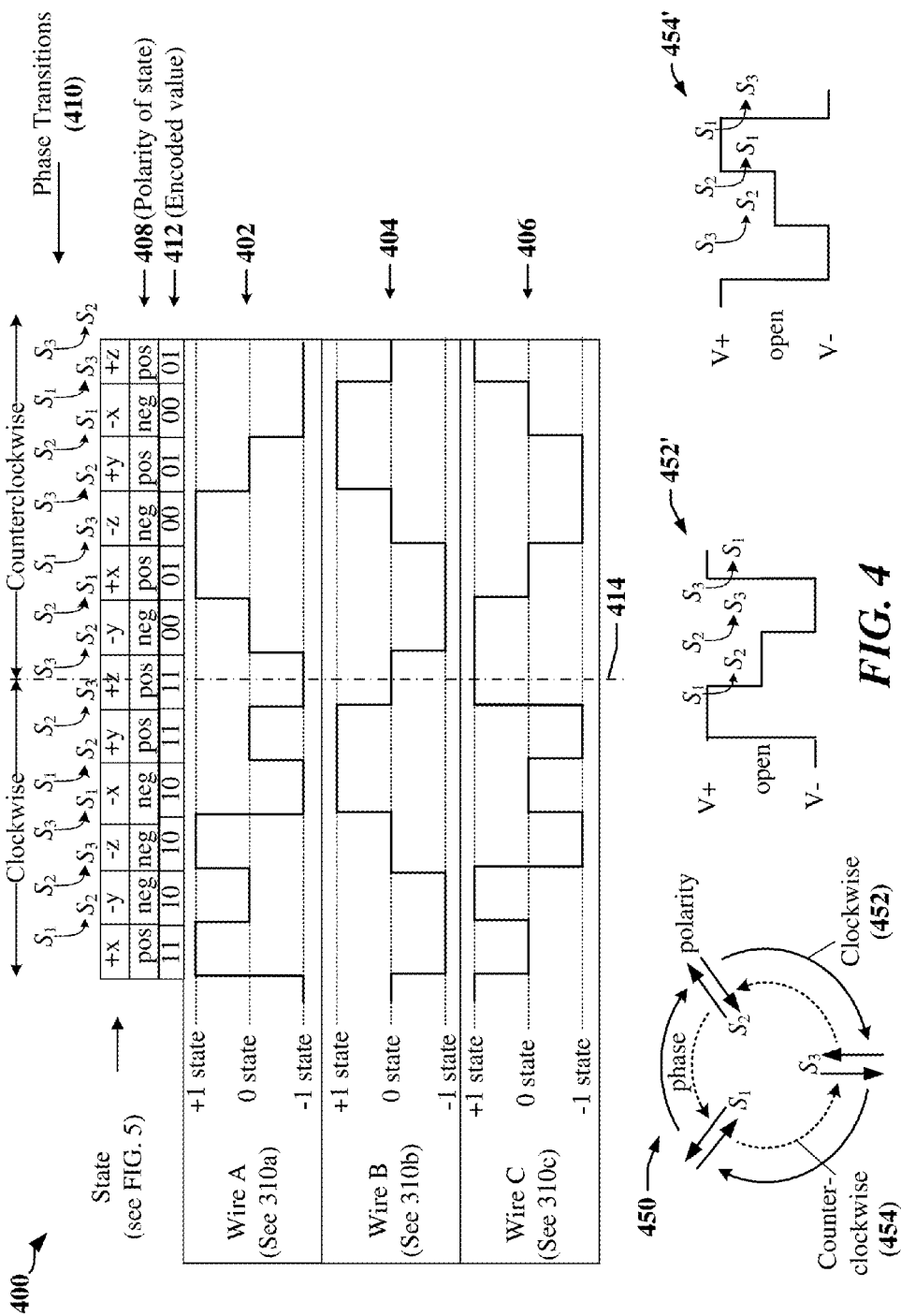
FIG. 4 illustrates signaling in an example of an N-phase polarity encoded interface.

FIG. 4 illustrates an example of signaling 400 employing a 3-phase modulation data-encoding scheme based on the circular state transition diagram 450. According to the data-encoding scheme, a 3-phase signal may rotate in two directions and may be transmitted on three wires 310a, 310b and 310c, identified as connectors A, B, and C. Each of the three signals is independently driven on the wires 310a, 310b, 310c. Each of the three signals includes the 3-phase signal, with each signal being 120 degrees out of phase relative to the other two signals. At any point in time, each of the three wires 310a, 310b, 310c is in a different one of the states {+1, 0, −1}. At any point in time, each of the three wires 310a, 310b, 310c in a 3-wire system is in a different state than the other two wires. When more than three conductors or wires are used, two or more pairs of wires may be in the same state. The illustrated encoding scheme may also encode information in the polarity of the two wires 310a, 310b and/or 310c that are actively driven to the +1 and −1 states. Polarity is indicated at 408 for the sequence of states depicted.

At any phase state in the illustrated 3-wire example, exactly two of the wires 310a, 310b, 310c carry a signal which is effectively a differential signal for that phase state, while the third wire 310a, 310b or 310c is undriven. The phase state for each wire 310a, 310b, 310c may be determined by voltage difference between the wire 310a, 310b or 310c and at least one other wire 310a, 310b and/or 310c, or by the direction of current flow, or lack of current flow, in the wire 310a, 310b or 310c. As shown in the state transition diagram 450, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counter-clockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a 3-wire, 3-phase communication link, clockwise rotations ($S_1$ to $S_2$), ($S_2$ to $S_3$), and/or ($S_3$ to $S_1$) at a phase transition 410 (between states) may be used to encode a logic 1, while counter-clockwise rotations ($S_1$ to $S_3$), ($S_3$ to $S_2$), and/or ($S_2$ to $S_1$) at the phase transition 410 may be used to encode a logic 0. Accordingly a bit may be encoded at each transition by controlling whether the signal is "rotating" clockwise or counter-clockwise. For example, a logic 1 may be encoded when the three wires 310a, 310b, 310c transition from phase state $S_1$ to phase state $S_2$ and a logic 0 may be encoded when the three wires 310a, 310b, 310c transition from phase state $S_1$ to phase state $S_3$. In the simple 3-wire example depicted, direction of rotation may be easily determined based on which of the three wires 310a, 310b, 310c is undriven before and after the transition.

Information may also be encoded in the polarity and/or changes of polarity of state 408 of the driven wires 310a, 310b, 310c, or in the direction of current flow or changes in the direction of current flow between two wires 310a, 310b, 310c. Signals 402, 404, and 406 illustrate voltage levels applied to wires 310a, 310b, 310c, respectively at each phase state in a 3-wire, 3-phase link. At any time, a first wire 310a, 310b, 310c is coupled to a more positive voltage (+V, for example), a second wire 310a, 310b, 310c is coupled to a more negative voltage (−V, for example), while the third wire 310a, 310b, 310c may be open-circuited. As such, one polarity encoding state may be determined by the current flow between the first and second wires 310a, 310b, 310c or the voltage polarities of the first and second wires 310a, 310b, 310c. In some embodiments, two bits of data 412 may be encoded in each phase transition 410. A decoder may determine the direction of signal phase rotation to obtain the first bit. The second bit may be determined based on the polarity difference between two of the signals 402, 404 and 406. In some instances, the second bit may be determined based on a change or lack of change in polarity of the differential signal transmitted on a pair of the wires 310a, 310b, 310c. The decoder having determined direction of rotation can determine the phase state and the polarity of the voltage applied between the two active wires 310a, 310b and/or 310c, or the direction of current flow through the two active wires 310a, 310b and/or 310c.

In the example of the 3-wire, 3-phase link described herein, one bit of data may be encoded in the rotation, or phase change in the 3-wire, 3-phase link, and an additional bit may be encoded in the polarity or changes in polarity of two driven wires. Certain embodiments, encode more than two bits in each transition of a 3-wire, 3-phase encoding system by allowing transition to any of the possible states from a current state. Given three rotational phases and two polarities for each phase, 6 states are defined, such that 5 states are available from any current state. Accordingly, there may be $\log_2(5) \approx 2.32$ bits per symbol (transition) and the mapper may accept a 16-bit word and convert it to 7 symbols.

In one example, an encoder may transmit symbols using 6 wires with two pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4}{(4-2)! \cdot 2!} = 6$$

different combinations of polarity for each phase state.

The 15 different combinations of actively driven wires may include:

| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

| + + − − | + − − + | + − + − | − + − + | − + + − | − − + + |

Accordingly, the total number of different states may be calculated as 15×6=90. To guarantee a transition between symbols, 89 states are available from any current state, and the number of bits that may be encoded in each symbol may be calculated as: $\log_2(89) \approx 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right).$$

Figure 5:
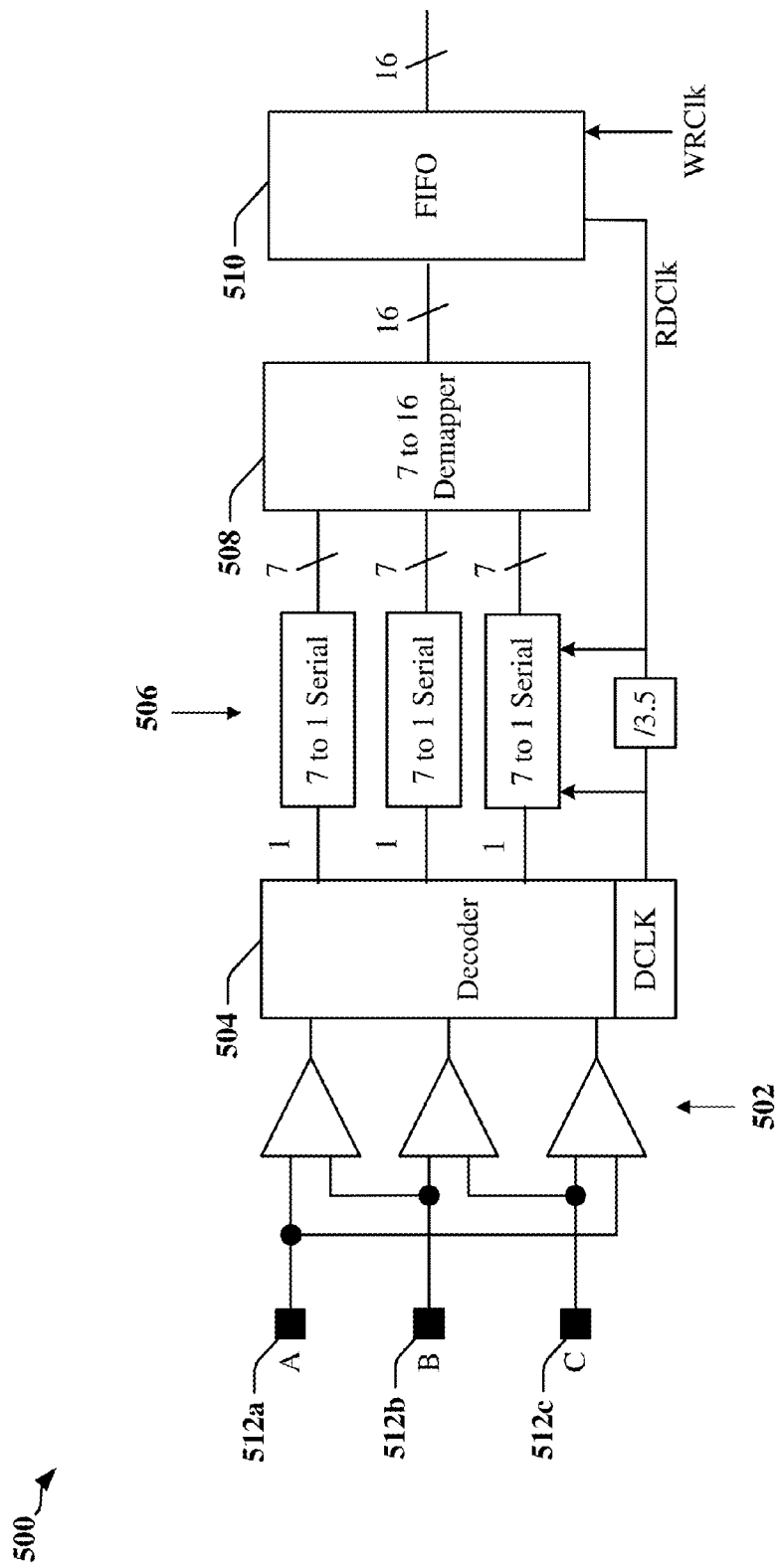
FIG. 5 illustrates an example of an N-phase polarity decoder.

FIG. 5 illustrates an example 500 of a receiver in a 3-wire, 3-phase PHY. The 3-wire, 3-phase example is illustrative of certain principles of operation applicable to other configurations of M-wire, N-phase receivers. Comparators 502 and a decoder 504 are configured to provide a digital representation of the state of each of three transmission lines 512a, 512b and 512c, as well as the change in the state of the three transmission lines compared to the state transmitted in the previous symbol period. Seven consecutive states are assembled by serial-to-parallel convertors 506 to produce a set of 7 symbols to be processed by demapper 508 to obtain 16 bits of data that may be buffered in a first-in-first-out (FIFO) register 510, or the like.

Figure 6:
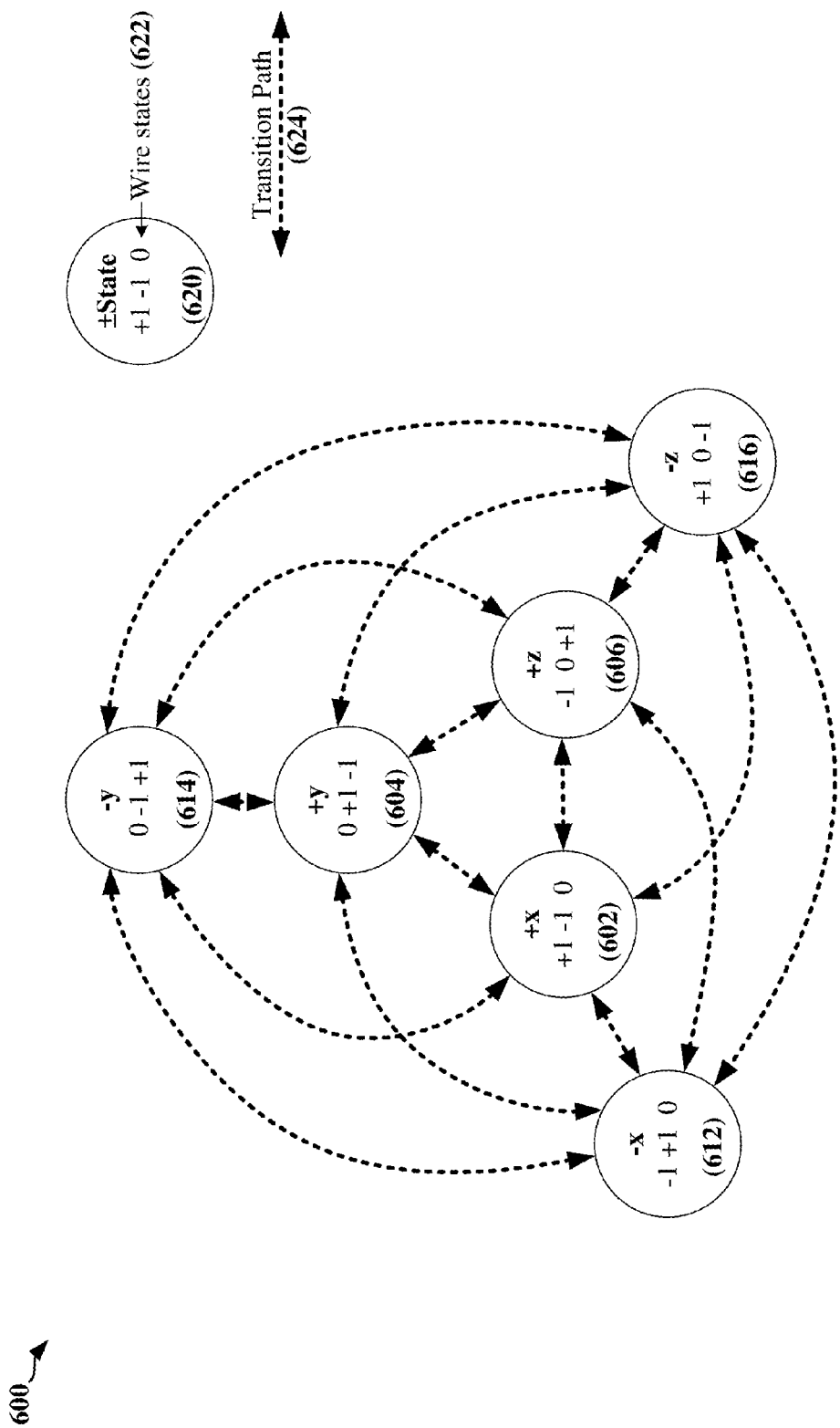
FIG. 6 is a state diagram illustrating the possible state transitions in the example of a 3-wire, 3-phase communication link.

FIG. 6 is a state diagram 600 illustrating 6 states and 30 possible state transitions in the example of a 3-wire, 3-phase communication link. The communication link may be operated in accordance with MIPI Alliance C-PHY protocols, for example. The signaling state of the communication link is defined by symbols transmitted for a duration of time (the symbol transmission interval) that is defined by a transmission clock used by a transmitter. The signaling state of the communication link may be characterized as the phase and polarity of a 3-phase signal that is transmitted on each of the three wires of the communication link, where each wire carries a version of the 3-phase signal that is phase-shifted with respect to the other two wires. The phase shift may be nominally set to 120°. That is, for each symbol transmission interval, the signal transmitted on each wire is in a different phase than the signals transmitted on the other two wires. The three phases may include two opposite polarity signaling states and an undriven state. In one example, the three states include a +V state, a 0V state and a −V state. In another example, the three states include a +V state, a +V/2 state and a 0V state, where the +V/2 may be the undriven state. A 3-phase signal may provide three possible phase states {P1, P2, P3}, and the 3-phase signal may rotate in two directions: P1→P2→P3→P1 or P1→P3→P2→P1. In general, a current symbol defines a first signaling state of the three wires, and the next symbol defines a second signaling state of the three wires, where at least one wire changes signaling state between the first and second signaling states.

FIG. 6 expands on the state transition diagram 450 in FIG. 4 by depicting all possible states 602, 604, 606, 612, 614 and 616 and illustrates the operation of one example of transition encoding with respect to the individual states 602, 604, 606, 612, 614 and 616. The possible states 602, 604, 606, 612, 614 and 616 include positive-polarity and negative-polarity versions of the phase states $S_1$, $S_2$ and $S_3$ illustrated in the phase transition diagram 450 of FIG. 4. For clarity, the set of phase/polarity states are labeled alphabetically and includes {+x, −x, +y, −y, +z, −z} where, for example, +x and −x represent states with the same phase state but different polarity. As shown in the model state element 620, each state 602, 604, 606, 612, 614 and 616 in the state diagram 600 includes a field 622 showing the voltage state of signals 402, 404 and 406, which are transmitted on wires 310a, 310b and 310c, respectively. For example, in state 602 (+x) signal 402=+1, signal 404=−1 and signal 406=0.

Also shown in FIG. 6 are the possible transition paths (see, for example, the model transition path 624) between the states 602, 604, 606, 612, 614 and 616. As noted herein, clock information may be embedded in 3-phase signals by ensuring that a transition in signaling state of the communication link occurs at the boundary between each pair consecutively transmitted symbols. Five possible transitions are available from any current state 602, 604, 606, 612, 614 or 616.

MIPI Alliance C-PHY Wiring Misalignment

Figure 7:
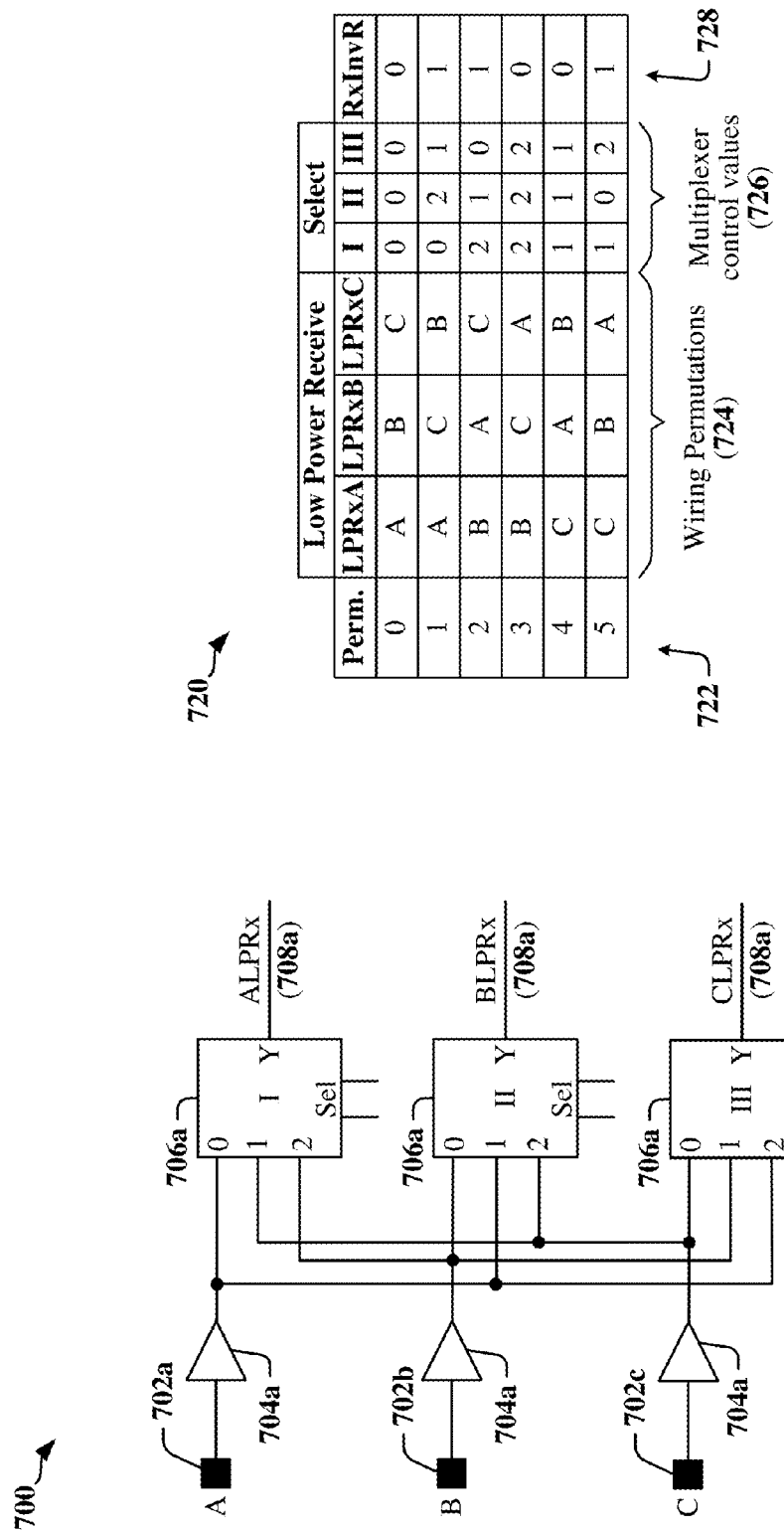
FIG. 7 illustrates an example of a receiver that supports communication over misaligned wires in a 3-wire interface according to certain aspects disclosed herein.

MIPI Alliance C-PHY interfaces may be used to interconnect various IC devices within a device, on a chip carrier, circuit board, or the like. In some instances, there may be limited options for positioning and/or routing of wires, traces, or other connectors. In such instances, it may be preferable or necessary to connect inputs of a first device to the outputs of a second device coupled to the multi-wire interface without regard to functional alignment of the inputs and outputs. FIG. 7 illustrates an example of a receiver 700 that supports communication over misaligned wires 702a, 702b, 702c (A, B, and C) in a 3-wire interface, and FIG. 8 illustrates an example of a transmitter 800 that supports communication over misaligned wires 802a, 802b, 802c (A, B, and C) in a 3-wire interface.

In the example illustrated in FIG. 7, the receiver 700 may be coupled to a transmitter 800 such that the A input of the receiver 700 is connected to the C output of the transmitter 800, the B input of the receiver 700 is connected to the B output of the transmitter 800, and the C input of the receiver 700 is connected to the A output of the transmitter 800, in a configuration that may be referred to as an CBA configuration. When the 3-wire interface is configured for single-ended operation, in a low-power mode of the C-PHY interface for example, multiplexers 706a, 706b, 706c may be employed to realign the three wires 702a, 702b, 702c. In the CBA example, the multiplexers 706a, 706b, 706c may be controlled to produce an ABC alignment of inputs to the symbol decoding logic. The multiplexers 706a, 706b, 706c may be provided between line receivers 704a, 704b, 704c and a symbol decoding logic and circuits.

FIG. 7 includes a table 720 that shows selection values 726 that may be used to control the multiplexers 706a, 706b, 706c for the possible wiring permutations 724 in a 3-wire interface, where each permutation is identified by a permutation number 722. In addition, the table indicates the state of an inversion control signal 728 provided in accordance with certain aspects disclosed herein.

Figure 8:
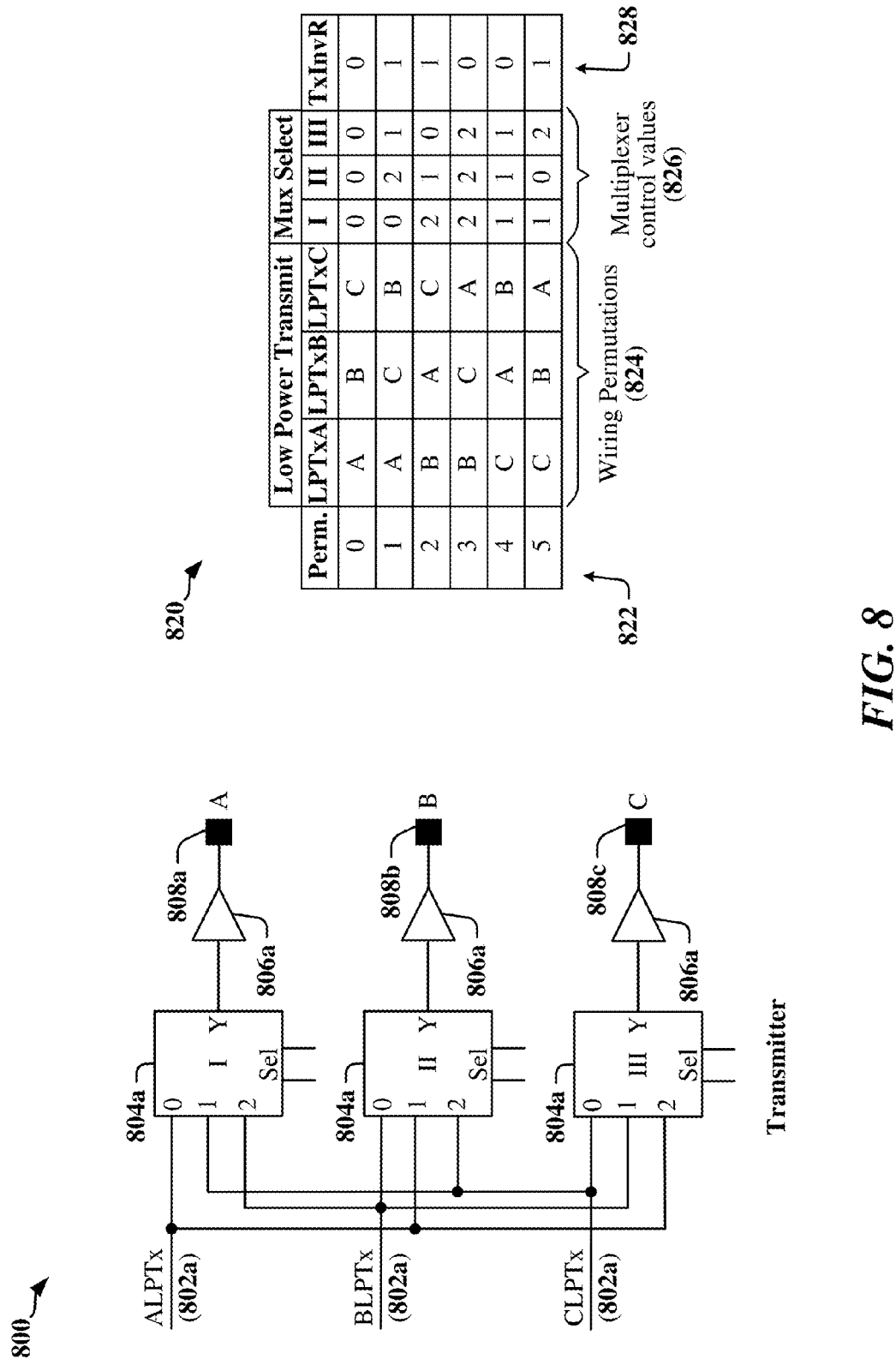
FIG. 8 illustrates an example of a transmitter that supports communication over misaligned wires in a 3-wire interface according to certain aspects disclosed herein.

In the example illustrated in FIG. 8, the transmitter 800 may be coupled to a receiver 700 such that the A output of the transmitter 800 is connected to the B input of the receiver 700, the B output of the transmitter 800 is connected to the C input of the receiver 700, and the C output of the transmitter 800 is connected to the A input of the receiver 700, in a configuration that may be referred to as an BCA configuration. When the 3-wire interface is configured for single-ended operation, in a low-power mode of the C-PHY interface for example, multiplexers 806a, 806b, 806c may be employed to realign the three wires 802a, 802b, 802c. In the BCA example, the multiplexers 806a, 806b, 806c may be controlled to produce an ABC configuration for transmission on the 3-wires. The multiplexers 806a, 806b, 806c may be provided between line receivers 804a, 804b, 804c and a symbol decoding logic and circuits.

FIG. 8 includes a table 820 that shows selection values 826 that may be used to control the multiplexers 806a, 806b, 806c for the possible wiring permutations 824 in a 3-wire interface, where each permutation is identified by a permutation number 822. In addition, the table indicates the state of an inversion control signal 828 provided in accordance with certain aspects disclosed herein.

Misalignments may be corrected by controlling the multiplexers 706a, 706b, 706c of the receiver 700 and/or the multiplexers 806a, 806b, 806c of the transmitter 800. For example, a misalignment may be corrected if only one device is equipped with a receiver 700 and/or a transmitter 800 with corresponding multiplexers 706a, 706b, 706c and 806a, 806b, 806c. When both devices are equipped with a receiver 700 and/or a transmitter 800 capable of correcting misalignments, one device may be assigned responsibility for correcting misalignment (e.g., the receiving device or transmitting device may be responsible). In some instances, both devices may operate their respective receivers 700 and/or transmitters 800 to match a wiring configuration of the 3-wire interface. That is, both devices may control their respective multiplexers 706a, 706b, 706c and/or 806a, 806b, 806c to align internal connectors with a predefined wiring configuration of the 3-wire link.

Figure 9:
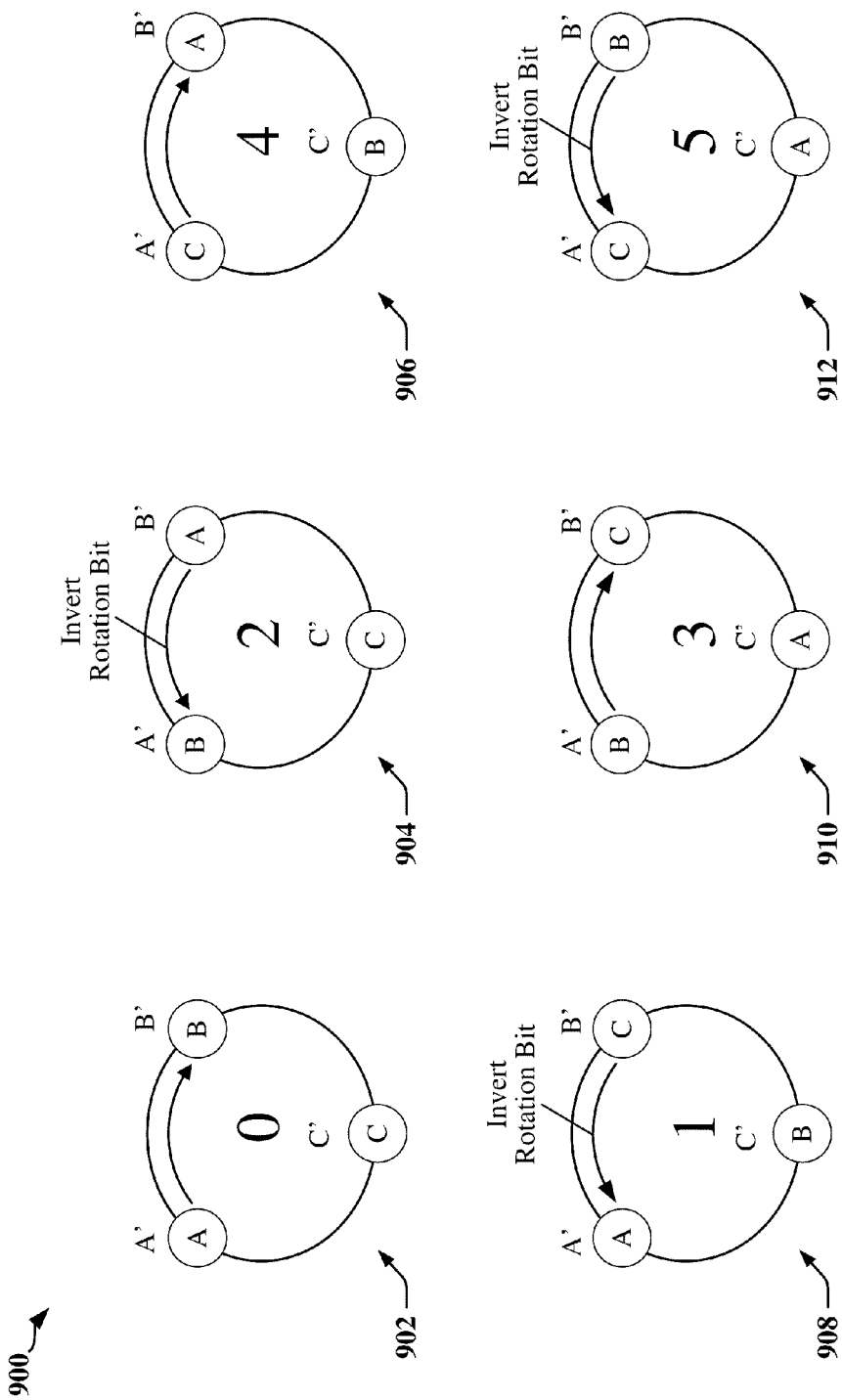
FIG. 9 is a diagram that illustrates certain aspects of 3-Phase coding that may be leveraged to correct for various effects of misaligned wires in accordance with certain aspects disclosed herein.

According to certain aspects disclosed herein, wiring misalignments in a 3-phase, 3-wire interface may be corrected without the use of multiplexers, a switch matrix, or the like. FIG. 9 is a diagram 900 that illustrates certain aspects of 3-Phase coding that may be leveraged to correct misaligned signals. In the diagram 900 the A, B and C wires of a 3-phase trio are represented as points on circles 902, 904, 906, 908, 910, 912 that collectively represent all six possible permutations of the three wires. The circles 902, 904, 906, 908, 910, 912 include a numerical identification corresponding to the permutation numbers 722, 822 identified in FIGS. 7 and 8. On each circle 902, 904, 906, 908, 910, 912, an aligned configuration of wires (i.e., the aligned wires A', B', C') in a properly aligned interface is provided alongside the configuration of wires represented by the circle 902, 904, 906, 908, 910, 912.

Figure 10:
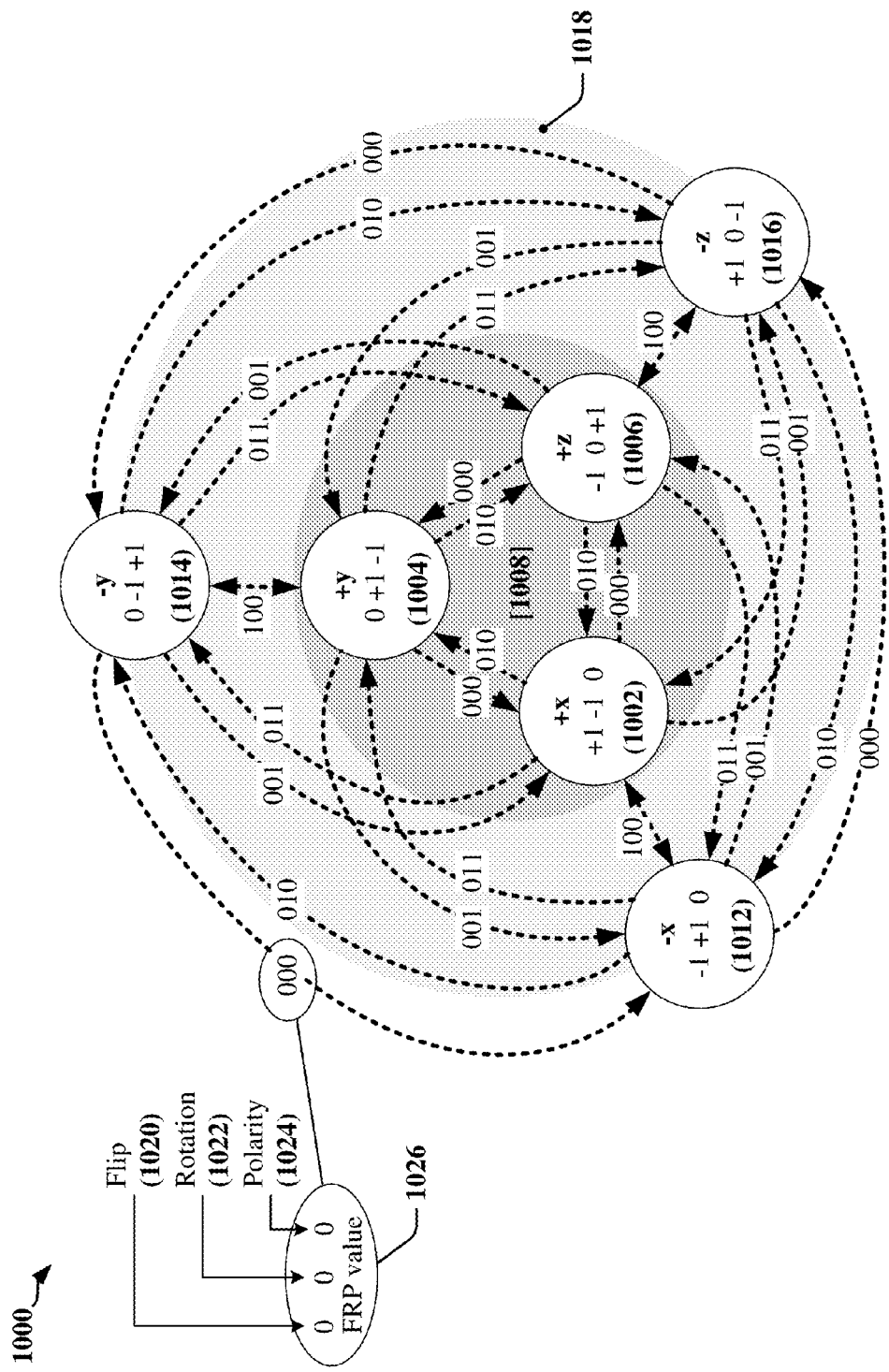
FIG. 10 is state diagram illustrating all possible signaling states and transitions in a 3-wire 3-phase interface.

FIG. 10 is state diagram 1000 illustrating all possible signaling states 1002, 1004, 1006, 1012, 1014, 1016 of the three wires, with all possible transitions illustrated from each state. The transitions in the state diagram 1000 can be represented by a Flip, Rotate, Polarity (FRP) symbol 1026 that has one of the three-bit binary values in the set: {000, 001, 010, 011, 100}. The Rotation bit 1022 of the FRP symbol 1026 indicates the direction of phase rotation associated with a transition to a next state. The Polarity bit 1024 of the FRP symbol 1026 is set to binary 1 when a transition to a next state involves a change in polarity. When the Flip bit 1020 of the FRP symbol 1026 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 1026 corresponds to wire state changes for each transition. The state diagram 1000 may be separated into an inner circle 1008 that includes the positive polarity states 1002, 1004, 1006 and an outer circle 1018 that encompasses the negative polarity states 1012, 1014, 1016.

With continued reference to FIGS. 9 and 10, polarity changes at symbol transitions result in the same change in polarity state regardless of the permutation of wires. That is a change from a positive polarity state 1002, 1004, or 1006 (i.e. the inner circle 1008) to a negative polarity state 1012, 1014, or 1016 (i.e. the outer circle 1018) generates the same property that defines the Polarity and Flip bits of the FRP symbol 1026.

The Rotation bit 1022 of the FRP symbol 1026 is not affected by misalignments that result in the clockwise (or counter-clockwise) order of states being preserved as a result of wire permutation. For example, the clockwise order of the wires remains constant for the ABC, BCA and CAB configurations, which are represented as the '0' permutation (circle 902), the '3' permutation (circle 910), and the '4' permutation (circle 906). The Rotation bit 1022 of the FRP symbol 1026 is inverted by misalignments that result in the clockwise (and counter-clockwise) order of states being altered as a result of wire permutation. For example, the clockwise order of the wires is reversed for the ACB, BAC and CBA configurations, which are represented as '1' permutation (circle 908), the '2' permutation (circle 904), and the '5' permutation (circle 912). The table 1100 in FIG. 11 maps wire states of an un-permutated trio of wires to states occurring for different permutations of wire configuration. A simple swap of any pair of signals (for example: configurations BAC, ACB, CBA) will change the direction of rotation, but the Polarity bit 1024 and the Flip bit 1020 are unaffected.

Certain transmitters and receivers constructed according to certain aspects disclosed herein may invert the Rotation bit 1022 of an FRP symbol 1026 in order to correct wire misalignments in a 3-wire, 3-phase interface, including in a MIPI Alliance C-PHY high-speed mode interface for example. In one example, the Rotation bit 1022 of an FRP symbol 1026 may be inverted at an encoder of a transmitter adapted according to certain aspects disclosed herein. In another example, the Rotation bit 1022 of an FRP symbol 1026 may be inverted at a decoder of a receiver adapted according to certain aspects disclosed herein. In another example, the Rotation bit 1022 of an FRP symbol 1026 may be inverted at a demapper of a receiver adapted according to certain aspects disclosed herein. In another example, the Rotation bit 1022 of an FRP symbol 1026 may be inverted at a mapper of a transmitter adapted according to certain aspects disclosed herein.

Figure 12:
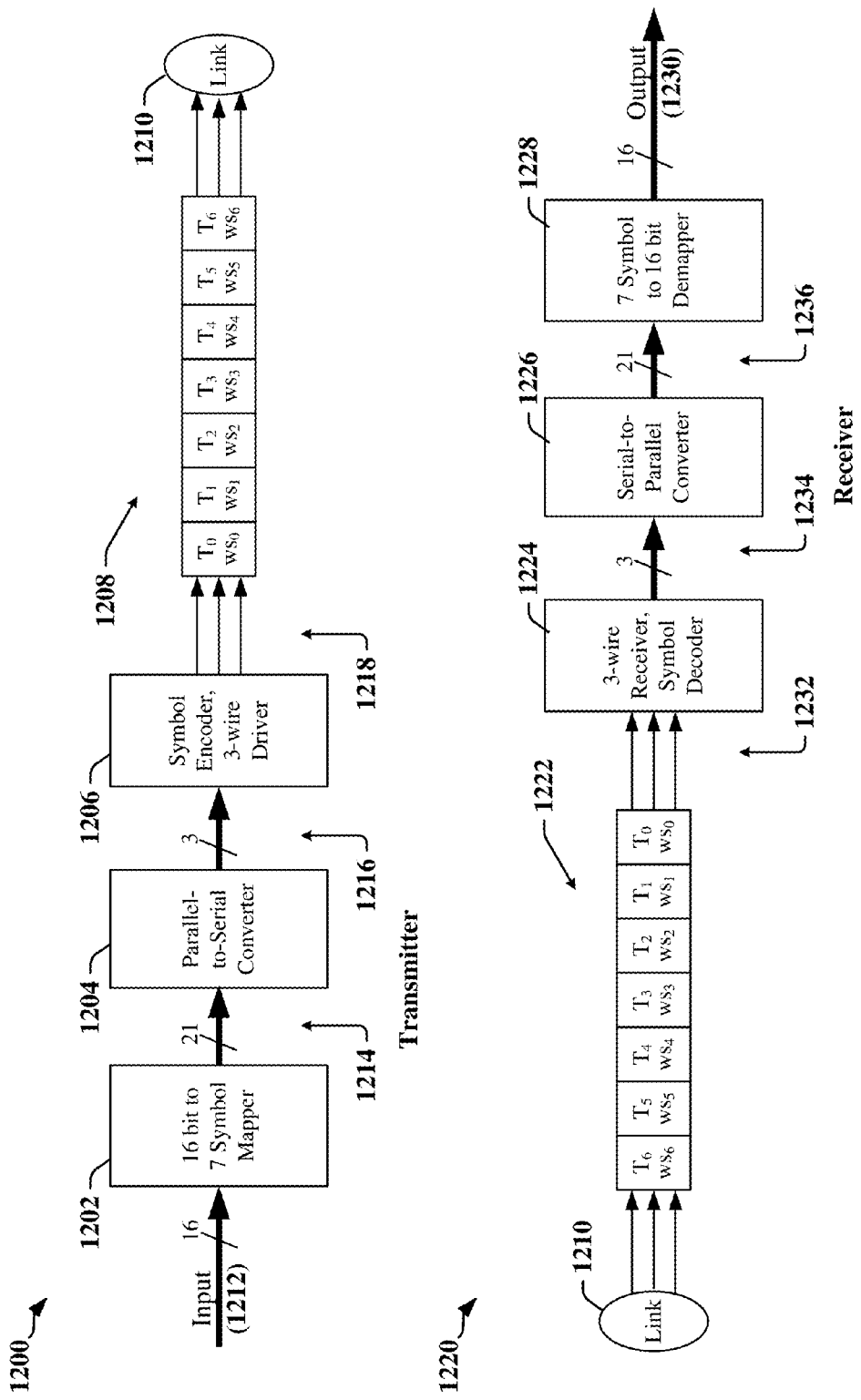
FIG. 12 illustrates a transmitter and a receiver in a 3-wire, 3-phase interface that may be adapted in accordance with certain aspects disclosed herein.

FIG. 12 illustrates a transmitter 1200 and a receiver 1220 configured for a 3-wire, 3-phase interface. A 16-bit data word is received as an input 1212 to a Mapper 1202 in the transmitter 1200. The Mapper 1202 maps the 16-bit data to a 21-bit word representative of 7 symbols. The 7 symbols are provided in a sequence of 3-bit symbols 1216 using a Parallel-To-Serial converter. Each symbol in the sequence of 3-bit symbols 1216 may be provided as, or used to provide an FRP symbol 1026 input to a Symbol Encoder/Driver 1206 configured to produce a sequence of signaling states 1208 on 3-wire link 1210.

At the receiver 1220, a Receiver/Symbol Decoder 1224 decodes a sequence of FRP symbols 1222 received from the data link 1210. In wire-aligned or alignment-corrected operation, the Receiver/Symbol Decoder 1224 produces a sequence of FRP symbols 1222 that is provided to a Serial-to-Parallel Converter 1226, which in turn provides a 21-bit word to a Demapper 1228. The 16-bit output 1230 of the Demapper 1228 corresponds to the input 1212 of the transmitter 1200.

As noted herein, the sequence of FRP symbols 1222 received at the receiver 1220 may appear to be different from the sequence of 3-bit symbols 1216 transmitted by the transmitter 1200 due to wire misalignment.

Figure 13:
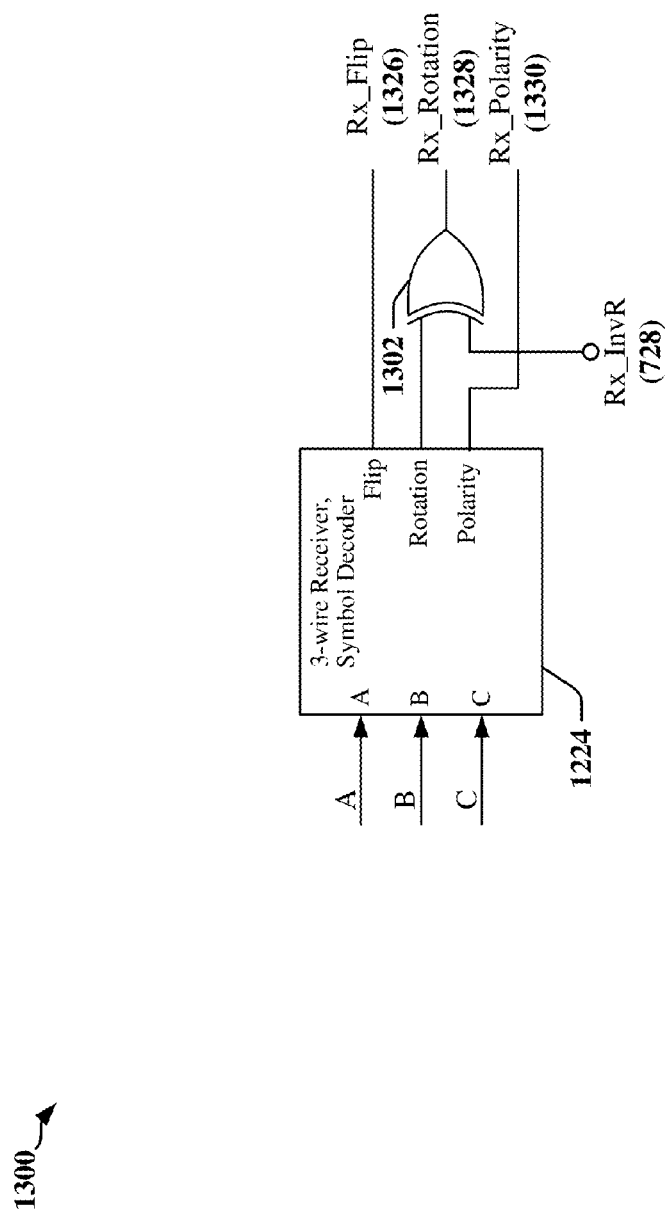
FIG. 13 is a block schematic diagram that illustrates a first example of logic that may be employed to correct wire misalignment according to certain aspects disclosed herein.

FIG. 13 is a block schematic diagram 1300 that illustrates a first example of logic that may be employed to correct wire misalignment. The logic of the first example may be used in a receiver. Inverting logic, such as an exclusive-OR gate 1302 may be controlled by an inversion control (Rx_InvR) signal 728, which may be generated using logic configured in accordance with the table 720 of FIG. 7. The Rx_InvR signal 728 may be at a logic TRUE level when the clockwise order of the 3 wires is reversed (from the order ABC), and the TRUE logic level may cause the exclusive-OR gate 1302 to invert the Rotation bit output by the Receiver/Symbol Decoder 1224, thereby correcting for wiring misalignments.

Figure 14:
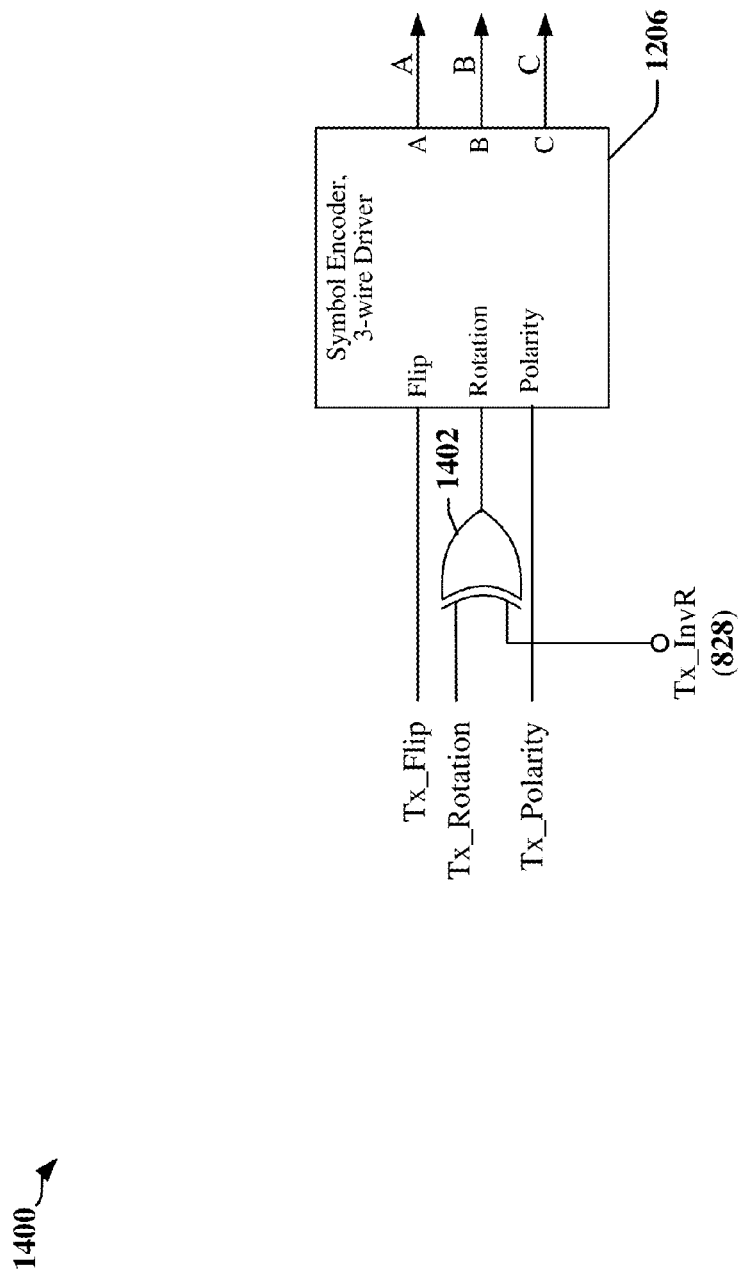
FIG. 14 is a block schematic diagram that illustrates a second example of logic that may be employed to correct wire misalignment according to certain aspects disclosed herein.

FIG. 14 is a block schematic diagram that illustrates a second example of logic that may be employed to correct wire misalignment. The logic of the second example may be used in a transmitter. Inverting logic, such as an exclusive-OR gate 1402 may be controlled by an inversion control (Tx_InvR) signal 828, which may be generated using logic configured in accordance with the table 820 of FIG. 8. The Tx_InvR signal 828 may be at a logic TRUE level when the clockwise order of the 3 wires is reversed (from the order ABC), and the TRUE logic level may cause the exclusive-OR gate 1402 to invert the Rotation bit provided to the Receiver/Symbol Encoder 1206, thereby correcting for wiring misalignments.

In some instances, the inversion of Rotation bits is performed on the 21-bit bus 1214 deployed between the Mapper 1202 and Parallel-to-Serial Converter 1204 of the transmitter 1200 side, and/or on the 21-bit bus 1236 between the Serial-to-Parallel Converter 1226 and the Demapper 1228 of the receiver 1220. In these examples, an inverting exclusive-OR gate may be provided for each of the seven rotation bits in the 21-bit bus.

Figure 15:
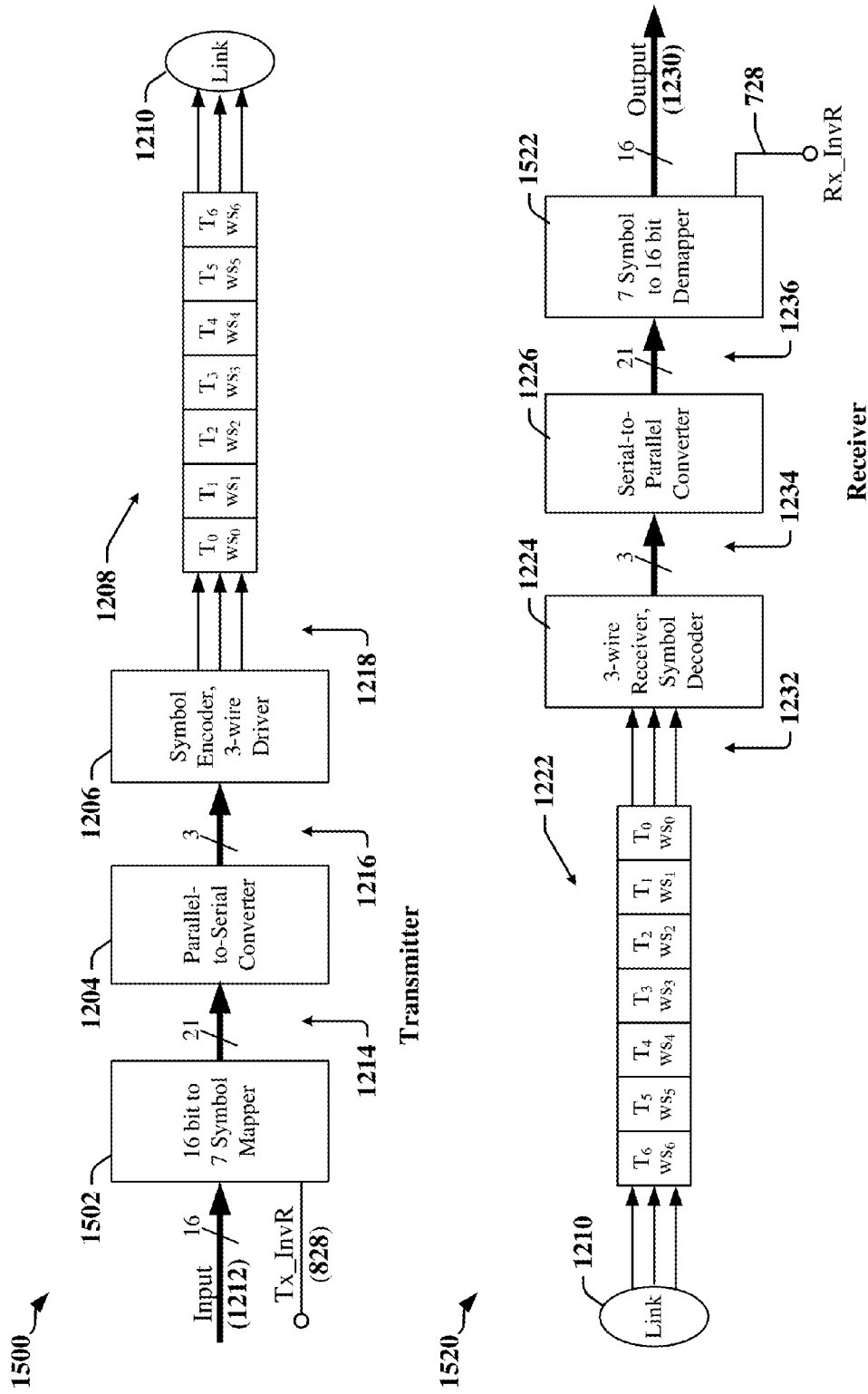
FIG. 15 is a block schematic diagram that illustrates a third example of logic that may be employed to correct wire misalignment according to certain aspects disclosed herein.

With reference now to FIG. 15, wiring misalignments may be corrected in a Mapper 1502 or Demapper 1522 adapted in accordance with certain aspects disclosed herein. In a transmitter 1500, the Mapper 1502 may be adapted to modify mapping criteria and/or one or more tables used in mapping data to a sequence of FRP symbols. Accordingly, the Mapper 1502 may respond to a TRUE logic level on the Tx_InvR signal 828 by producing altered FRP symbols that are inconsistent with coding for an aligned 3-wire interface. The encoding of the altered FRP symbols may be affected by the misalignment of the 3-wire interface in a manner that produces proper decoding at the receiver 1520. In the receiver 1520, the Demapper 1522 may be adapted to modify mapping criteria and/or one or more tables used in demapping data from a sequence of FRP symbols. Accordingly, the Demapper 1522 may respond to a TRUE logic level on the Rx_InvR signal 728 by producing an output 1230 that corresponds to the input 1212 when FRP symbols have been altered in transmission over a misaligned 3-wire interface.

In some instances, a transmitter 1200, 1500 and/or receiver 1220, 1520 constructed according to certain aspects disclosed herein may be provided on a semiconductor IC device. In one example, an IC device may be mounted on a circuit board in the anticipation that the configuration of interconnects will remain fixed. In this example, the decision on whether to invert the Rotation bit will remain constant for that particular device. That is, the Rx_InvR signal 728 and Tx_InvR signal 828 settings remain constant. The Rx_InvR signal 728 and Tx_InvR signal 828, or internal flags and/or switches in the Mapper 1502, Symbol Encoder/Driver 1206 Demapper 1522 and/or Receiver/Symbol Decoder 1224 may indicate a wiring configuration or permutation may be a configuration parameter that is sent to the PHY. In one example, the configuration parameter may range between 0 and 5 (indicating the exact permutation), and the PHY may determine whether to invert the Rotation bit of the FRP symbol 1026, in a manner consistent with the logic shown in the tables 720, 820 of FIGS. 7 and 8, respectively.

According to certain aspects, the configuration of the wires in the 3-wire link may be determined during startup or training of a 3-wire, 3-phase link. In some instances, symbols are transmitted over the 3-wire link to enable clock acquisition at the receiver and for other purposes. In some instances, a fixed sequence of symbols is transmitted that may be recognizable when the wiring is aligned and unrecognizable when wiring is unaligned. A receiver may alternate inversion status of the Rotation bit during synchronization until the synchronization sequence is recognized, and may thereby determine whether inversion is required during normal operation.

Figure 16:
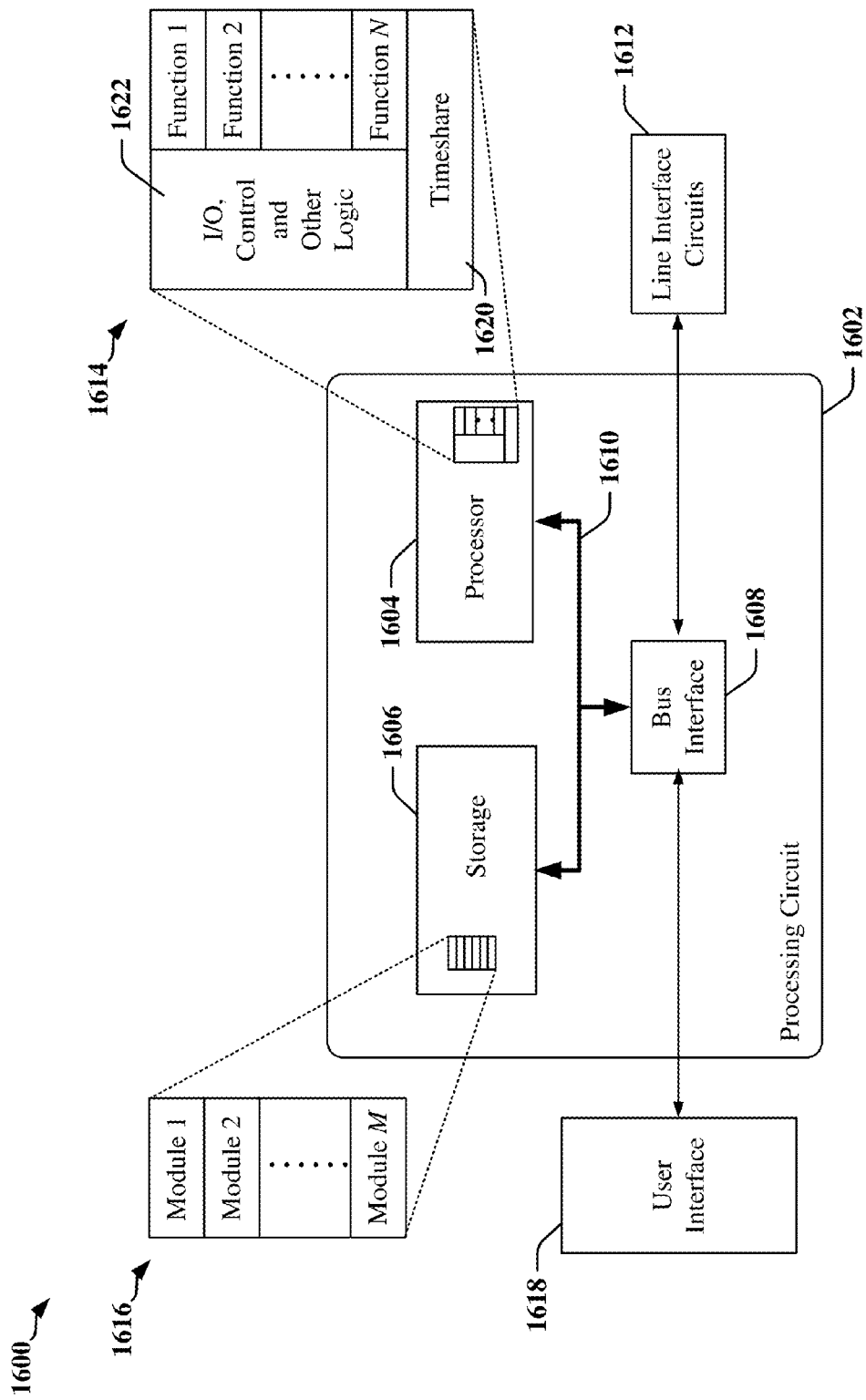
FIG. 16 is a block diagram illustrating an example of an apparatus employing a processing circuit that may be adapted according to certain aspects disclosed herein.

FIG. 16 is a conceptual diagram 1600 illustrating a simplified example of a hardware implementation for an apparatus employing a processing circuit 1602 that may be configured to perform one or more functions disclosed herein. In accordance with various aspects of the disclosure, an element, or any portion of an element, or any combination of elements as disclosed herein may be implemented using the processing circuit 1602. The processing circuit 1602 may include one or more processors 1604 that are controlled by some combination of hardware and software modules. Examples of processors 1604 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1604 may include specialized processors that perform specific functions, and that may be configured, augmented or controlled by one of the software modules 1616. The one or more processors 1604 may be configured through a combination of software modules 1616 loaded during initialization, and further configured by loading or unloading one or more software modules 1616 during operation.

In the illustrated example, the processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including the one or more processors 1604, and storage 1606. Storage 1606 may include memory devices and mass storage devices, and may be referred to herein as computer-readable media and/or processor-readable media. The bus 1610 may also link various other circuits such as timing sources, timers, peripherals, voltage regulators, and power management circuits. A bus interface 1608 may provide an interface between the bus 1610 and one or more line interface circuits 1612. A line interface circuit 1612 may be provided for each networking technology supported by the processing circuit. In some instances, multiple networking technologies may share some or all of the circuitry or processing modules found in a line interface circuit 1612. Each line interface circuit 1612 provides a means for communicating with various other apparatus over a transmission medium. Depending upon the nature of the apparatus, a user interface 1618 (e.g., keypad, display, speaker, microphone, joystick) may also be provided, and may be communicatively coupled to the bus 1610 directly or through the bus interface 1608.

A processor 1604 may be responsible for managing the bus 1610 and for general processing that may include the execution of software stored in a computer-readable medium that may include the storage 1606. In this respect, the processing circuit 1602, including the processor 1604, may be used to implement any of the methods, functions and techniques disclosed herein. The storage 1606 may be used for storing data that is manipulated by the processor 1604 when executing software, and the software may be configured to implement any one of the methods disclosed herein.

One or more processors 1604 in the processing circuit 1602 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1606 or in an external computer readable medium. The external computer-readable medium and/or storage 1606 may include a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a "flash drive," a card, a stick, or a key drive), a RAM, a ROM, a programmable ROM (PROM), an erasable PROM (EPROM), an EEPROM, a register, a removable disk, and any other suitable medium for storing software and/or instructions that may be accessed and read by a computer. The computer-readable medium and/or storage 1606 may also include, by way of example, a carrier wave, a transmission line, and any other suitable medium for transmitting software and/or instructions that may be accessed and read by a computer. Computer-readable medium and/or the storage 1606 may reside in the processing circuit 1602, in the processor 1604, external to the processing circuit 1602, or be distributed across multiple entities including the processing circuit 1602. The computer-readable medium and/or storage 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1606 may maintain software maintained and/or organized in loadable code segments, modules, applications, programs, etc., which may be referred to herein as software modules 1616. Each of the software modules 1616 may include instructions and data that, when installed or loaded on the processing circuit 1602 and executed by the one or more processors 1604, contribute to a run-time image 1614 that controls the operation of the one or more processors 1604. When executed, certain instructions may cause the processing circuit 1602 to perform functions in accordance with certain methods, algorithms and processes described herein.

Some of the software modules 1616 may be loaded during initialization of the processing circuit 1602, and these software modules 1616 may configure the processing circuit 1602 to enable performance of the various functions disclosed herein. For example, some software modules 1616 may configure internal devices and/or logic circuits 1622 of the processor 1604, and may manage access to external devices such as the line interface circuits 1612, the bus interface 1608, the user interface 1618, timers, mathematical coprocessors, and so on. The software modules 1616 may include a control program and/or an operating system that interacts with interrupt handlers and device drivers, and that controls access to various resources provided by the processing circuit 1602. The resources may include memory, processing time, access to the line interface circuits 1612, the user interface 1618, and so on.

One or more processors 1604 of the processing circuit 1602 may be multifunctional, whereby some of the software modules 1616 are loaded and configured to perform different functions or different instances of the same function. The one or more processors 1604 may additionally be adapted to manage background tasks initiated in response to inputs from the user interface 1618, the line interface circuits 1612, and device drivers, for example. To support the performance of multiple functions, the one or more processors 1604 may be configured to provide a multitasking environment, whereby each of a plurality of functions is implemented as a set of tasks serviced by the one or more processors 1604 as needed or desired. In one example, the multitasking environment may be implemented using a timesharing program 1620 that passes control of a processor 1604 between different tasks, whereby each task returns control of the one or more processors 1604 to the timesharing program 1620 upon completion of any outstanding operations and/or in response to an input such as an interrupt. When a task has control of the one or more processors 1604, the processing circuit is effectively specialized for the purposes addressed by the function associated with the controlling task. The timesharing program 1620 may include an operating system, a main loop that transfers control on a round-robin basis, a function that allocates control of the one or more processors 1604 in accordance with a prioritization of the functions, and/or an interrupt driven main loop that responds to external events by providing control of the one or more processors 1604 to a handling function.

In one example, the processing circuit 1602 may be provided in an apparatus that includes a communications interface coupled to the line interface circuits 1612 and configured to communicate data using a 3-phase signal transmitted in different phases on all three wires of a 3-wire communication link, and correction logic configured to correct phase relationships between two or more signals carried on the 3-wire communication link. The processing circuit 1602 may be configured to determine presence of a misalignment of the 3-wire communication link, and cause the correction logic to invert a first bit of a 3-bit symbol corresponding to a transition of signaling state of the 3-wire interface when a misalignment of the 3-wire communication link involving two or more wires is determined to affect the phase relationships between two or more signals carried on the 3-wire interface.

The processing circuit 1602 may be configured to select a table used to map data values to sequences of symbols based on whether a misalignment of the 3-wire communication link is determined to be present. Each symbol may be a 3-bit symbol, in which the first bit is inverted in a first table that is selected when the misalignment of the 3-wire communication link is determined to affect phase relationships between the two or more signals. The first bit in each symbol of the sequence of symbols is not inverted in a second table that is selected when the misalignment of the 3-wire communication link is determined not to affect phase relationships between the two or more signals.

The processing circuit 1602 may be configured to determine the presence of the misalignment of the 3-wire communication link by toggling the first bit in each symbol of a sequence of symbols transmitted on the 3-wire communication link during synchronization of the 3-wire communication link until synchronization information is decoded from sequence of symbols. The storage 1606 may maintain configuration information that indicates whether of the misalignment of the 3-wire communication link is present.

Figure 17:
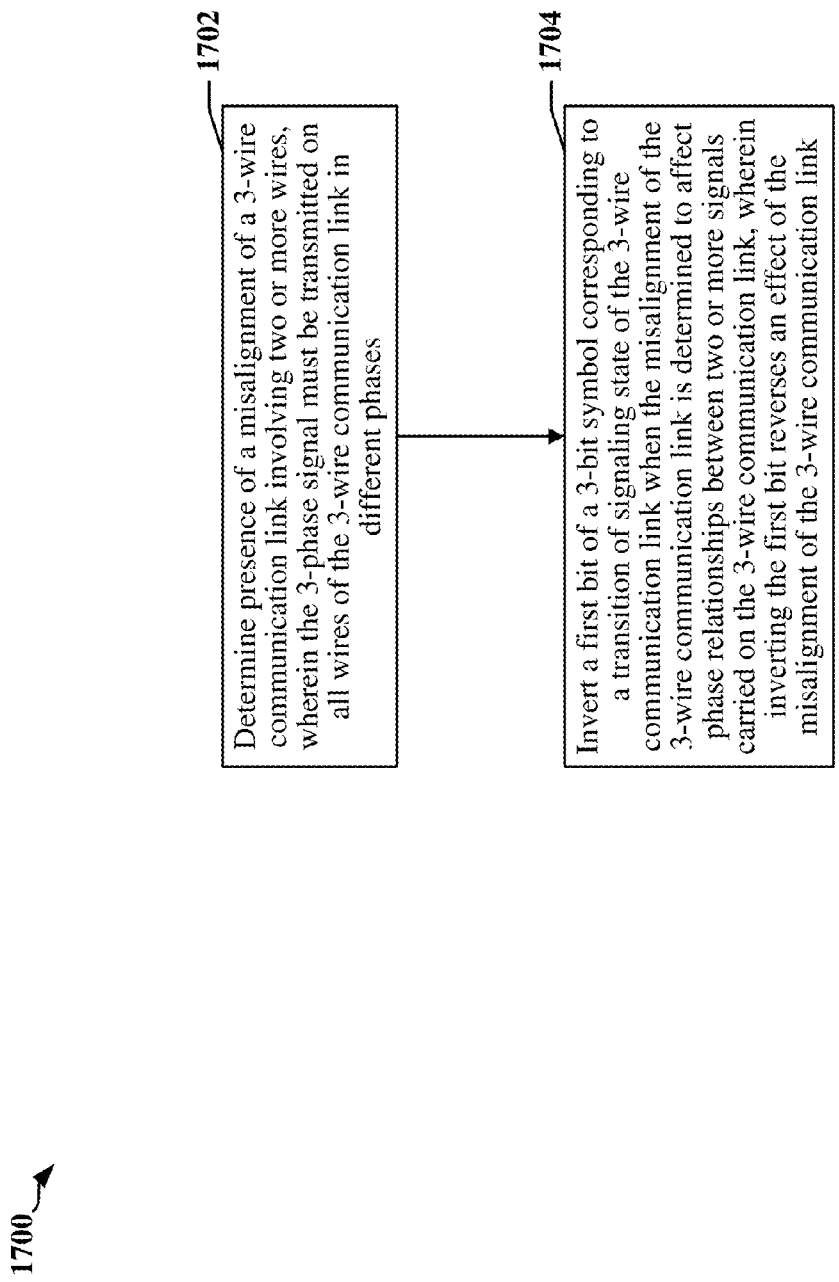
FIG. 17 is a flow chart of a method of wireless communication.

FIG. 17 is a flow chart 1700 of a method of wireless communication. The method may be performed by a device configured for communicating using a 3-phase signal transmitted over a 3-wire communication link. In one example, the device may include or cooperate with a processing circuit 1602.

At block 1702, the device may determine presence of a misalignment of the 3-wire communication link involving two or more wires. The 3-phase signal must be transmitted on all wires of the 3-wire communication link in different phases.

At block 1704, the device may invert a first bit of a 3-bit symbol corresponding to a transition of signaling state of the 3-wire communication link when the misalignment of the 3-wire communication link is determined to affect phase relationships between two or more signals carried on the 3-wire communication link. Inverting the first bit may reverse an effect of the misalignment of the 3-wire communication link.

According to certain aspects, the device may determine presence of the misalignment of the 3-wire communication link by determining that a receiver coupled to the 3-wire communication link has detected an incorrect direction of phase rotation between states of the 3-phase signal at the transition of signaling state of the 3-wire communication link. In one example, misalignments may be accurately determined when the direction of phase rotation is known or expected. For example, one or more preambles defined by C-PHY standards for transmission at the beginning of a high-speed burst may be used to determine presence or absence of misalignments.

Figure 18:
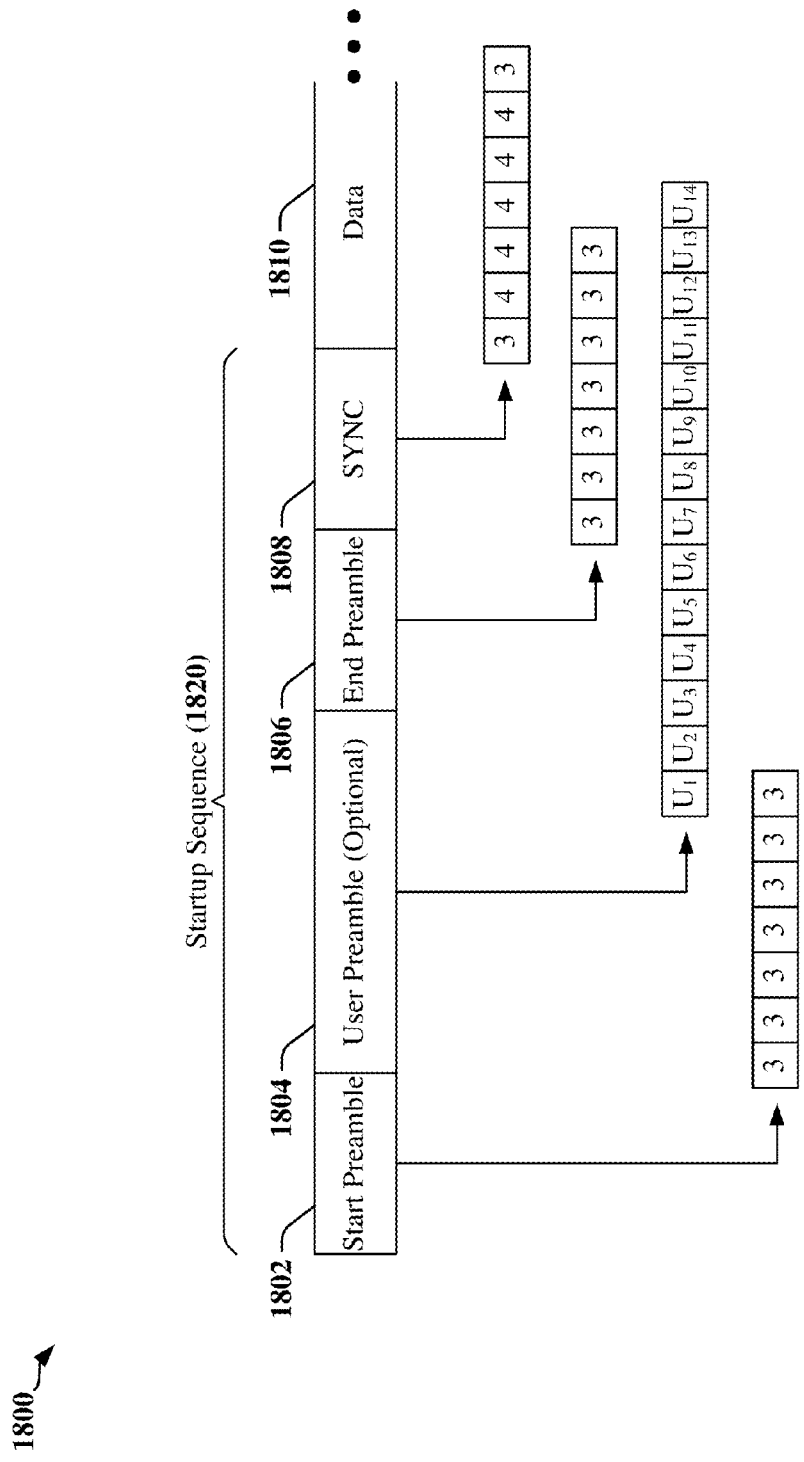
FIG. 18 illustrates an example of a startup sequence that may be used in accordance with certain aspects disclosed herein.

FIG. 18 is a diagram 1800 illustrating certain signaling that may be present in a C-PHY 3-phase interface. The signaling may include transmissions defined and/or used by interfaces that operate according to C-PHY standards. A startup sequence 1820 may be provided to enable a receiver to generate and synchronize its receive clock. The startup sequence 1820 may include a Start Preamble 1802, an optional User Preamble 1804, an End Preamble 1806, and a SYNC sequence 1808. After the startup sequence 1820, data 1810 may be transmitted in 7-symbol packets. For the purposes of this description, the component elements of the startup sequence 1820 are identified using the three-bit FRP symbol 1026 illustrated in FIG. 10, which is used to select the signaling state of the 3-wire communication link for each symbol.

As illustrated, the Start Preamble 1802 includes 7 symbols that have an FRP value of 3. The number of symbols provided in the Start Preamble 1802 may be based on specifications governing operation of the 3-phase interface and/or may be selected according to application needs. In one example, the Start Preamble 1802, which may also be referred to as the "PreBegin," may have a number of symbols that can range between 7 symbols and 448 symbols. The User Preamble 1804, when transmitted, includes 14 user-defined symbols, and the End Preamble 1806 includes 7 symbols that have an FRP value of 3. A SYNC sequence 1808 having a unique combination of 7 symbols which, for example, may begin and end with symbols that have an FRP value of 3, with the remaining 5 symbols having an FRP value of 4.

In some instances, the device may be adapted or configured to determine presence or absence of a misalignment of the 3-wire communication link using the Start preamble 1802 where each of the at least 7 symbols in the Start preamble 1802 has an FRP value of 3 (no flip, positive (clockwise) rotation, and invert polarity). When a wire misalignment occurs such that the wires are permuted in a sequence that inverted the rotation then the preamble would be received as a sequence of symbols that each have an FRP value of 1. An auto-detection circuit provided in the receiver may then monitor the Start Preamble 1802 at the beginning of each high-speed burst. In some instances, the configuration of wires in the 3-wire communication link may be assessed during the first high-speed burst and/or during the next high-speed burst occurring after an error has been detected in a high-speed transmission. In some instances, other fields of the Startup Sequence 1820 may be used to determine or confirm the configuration of wires in the 3-wire communication link. The configuration of wires in the 3-wire communication link, once determined, may be used to configure low-power mode drivers and receivers.

Referring again to FIG. 17, in some examples, the device may receive the 3-phase signal from the 3-wire communication link. The first bit of the 3-bit symbol may indicate direction of phase rotation between states of the 3-phase signal at the transition of signaling state of the 3-wire communication link.

In some examples, the device may transmit the 3-phase signal over the 3-wire communication link. The first bit of the 3-bit symbol may control direction of phase rotation between states of the 3-phase signal at the transition of signaling state of the 3-wire communication link.

In some examples, the device may select a table used by a mapper based on whether a misalignment of the 3-wire communication link is determined to be present. The 3-bit symbol may be one of a sequence of symbols generated by the mapper. The sequence of symbols may encode data to be transmitted over the 3-wire communication link. The first bit in each symbol of the sequence of symbols may be inverted in a first table that is selected when the misalignment of the 3-wire communication link is determined to affect phase relationships between the two or more signals. The first bit in each symbol of the sequence of symbols may not be inverted in a second table that is selected when the misalignment of the 3-wire communication link is determined not to affect phase relationships between the two or more signals.

In some examples, the device may select a table used by a demapper to decode data from a sequence of symbols received from the 3-wire communication link. The table is selected from a plurality of tables based on whether a misalignment of the 3-wire communication link is determined to be present.

In some examples, the device may determine the presence of the misalignment of the 3-wire communication link by receiving one or more sequences of symbols from the 3-wire communication link during a synchronization period, and determining that the 3-wire communication link is properly aligned when one or more synchronization words are successfully decoded without inverting a rotation bit output by a demapper circuit.

In some examples, the device may determine the presence of the misalignment of the 3-wire communication link by inverting the first bit in each symbol of a sequence of symbols received from the 3-wire communication link during synchronization of the 3-wire communication link, determining that the 3-wire communication link is misaligned when synchronization information is decoded from sequence of symbols while the first bit in the each symbol is inverted.

In some examples, the presence of the misalignment of the 3-wire communication link is determined from configuration information maintained by the device.

In some examples, the 3-wire communication link may be operated according to MIPI Alliance C-PHY 3-phase signaling standards.

Figure 19:
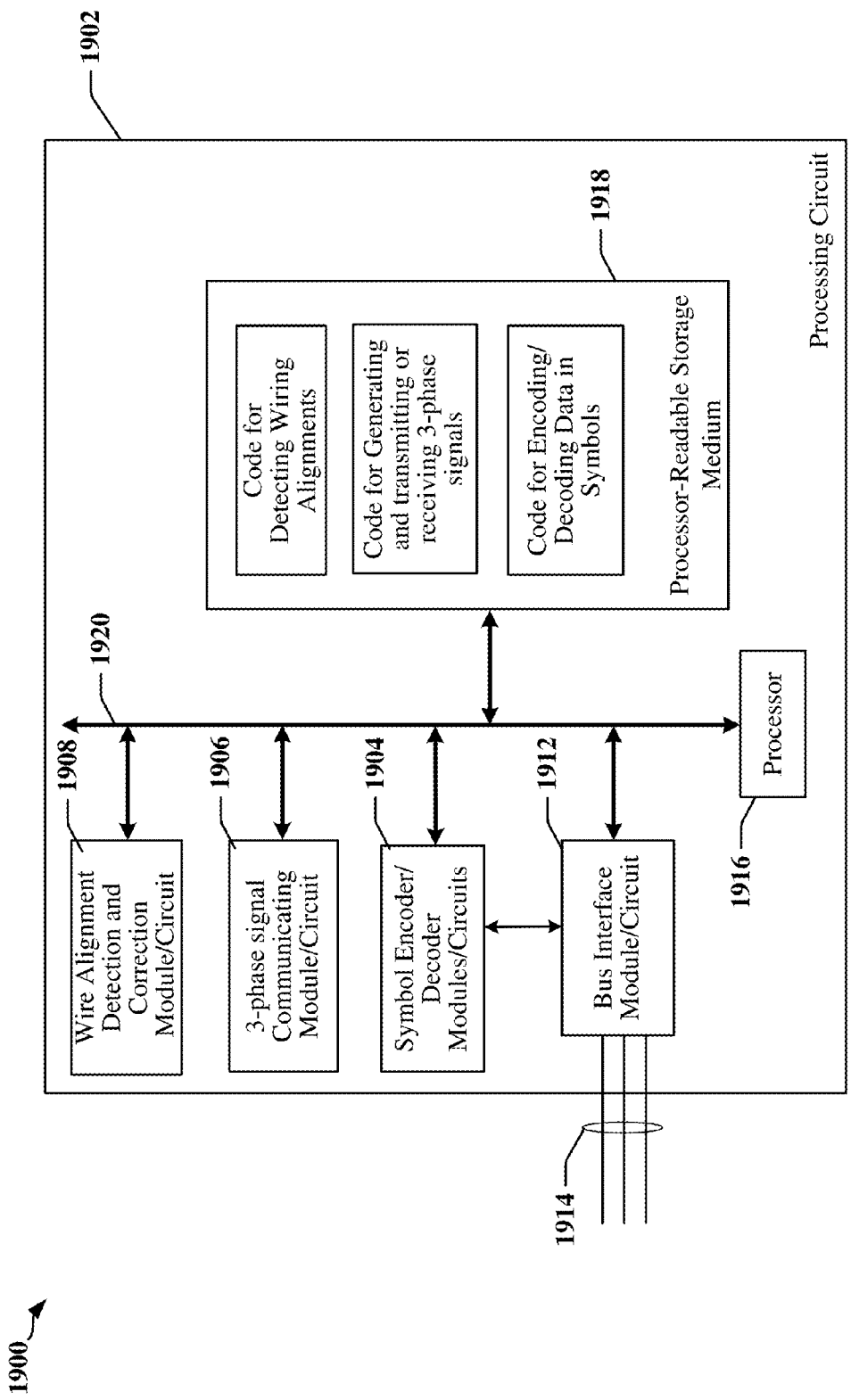
FIG. 19 is a diagram illustrating an example of a hardware implementation for an apparatus employing a processing employing a processing circuit adapted according to certain aspects disclosed herein.

FIG. 19 is a diagram illustrating a simplified example of a hardware implementation for an apparatus 1900 employing a processing circuit 1902. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the processor 1916, the modules or circuits 1904, 1906 and 1908, a plurality of different encoders 1910, line drivers configurable to drive connectors or wires of a communication link 1914 and the computer-readable storage medium 1918. The bus 1920 may also link various other circuits such as timing sources, peripherals, voltage regulators, and power management circuits, which are well known in the art, and therefore, will not be described any further.

The processor 1916 is responsible for general processing, including the execution of software stored on the computer-readable storage medium 1918. The software, when executed by the processor 1916, causes the processing circuit 1902 to perform the various functions described supra for any particular apparatus. The computer-readable storage medium 1918 may also be used for storing data that is manipulated by the processor 1916 when executing software. The processing circuit 1902 further includes at least one of the modules 1904, 1906 and 1908. The modules may be software modules running in the processor 1916, resident/stored in the computer-readable storage medium 1918, one or more hardware modules coupled to the processor 1916, or some combination thereof.

In one configuration, the apparatus 1900 for wireless communication includes circuits or modules 1904 for determining presence of a misalignment of the 3-wire interface involving two or more wires, and circuits or modules 1904, 1906 for inverting a first bit of a 3-bit symbol encoded in a transition of signaling state of the 3-wire bus when the misalignment of the 3-wire interface is determined to affect phase relationships between two or more signals carried on the three wires.

In one example, the apparatus 1900 may include means 1904, 1906, 1912 for transmitting a 3-phase signal on each of the three wires of the 3-wire communication link 1914 in different phases, including an encoder 1904 that encodes data in transitions of signaling state of the three wires of the communication link 1914. The apparatus 1900 may include means 1908 for determining presence of a misalignment of the 3-wire interface involving two or more wires of the communication link 1914. The apparatus 1900 may include means 1908 for correcting phase relationships between two or more signals carried on the three wires, including logic configured to invert a first bit of a 3-bit symbol corresponding to a transition of signaling state of the 3-wire communication link 1914 when the misalignment of the 3-wire communication link 1914 is determined to affect the phase relationships between the two or more signals.

In some examples, the 3-phase signal is received from the 3-wire communication link by a bus interface circuit 1912. The first bit of the 3-bit symbol may indicate a direction of phase rotation between states of the 3-phase signal at the transition of signaling state of the 3-wire communication link 1914.

In some examples, the apparatus 1900 transmits the 3-phase signal over the 3-wire communication link 1914. The first bit of the 3-bit symbol may control a direction of phase rotation between states of the 3-phase signal at the transition of signaling state of the 3-wire communication link 1914.

In some examples, data may be mapped to a sequence of symbols, including a first table used by a mapper when a misalignment of the 3-wire communication link is determined to be present, and a second table used by the mapper when no misalignment of the 3-wire communication link is determined to be present. The 3-bit symbol may be one of a sequence of symbols generated by the mapper, the sequence of symbols encoding the data for transmission over the 3-wire communication link.

In some examples, data may be decoded from a sequence of symbols received from the 3-wire communication link 1914, including a first table used by a demapper when a misalignment of the 3-wire communication link is determined to be present, and a second table used by the demapper when no misalignment of the 3-wire communication link 1914 is determined to be present.

In some examples, the apparatus 1900 may detect synchronization words received from the 3-wire communication link 1914. A first circuit may be configured or adapted to detect the synchronization words decoded from a sequence of symbols received from the 3-wire communication link 1914 during a synchronization period. A second circuit may operate in a first mode to invert a first bit of each symbol in the sequence of symbols. The first bit is not inverted in a second mode. Control logic may cause the second circuit to toggle between the first mode and a second mode until the first circuit detects the synchronization words.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A data transfer method operational on a device configured for communicating using a 3-phase signal transmitted over a 3-wire communication link, comprising:

determining presence of a misalignment of the 3-wire communication link involving two or more wires, wherein the 3-phase signal must be transmitted on all wires of the 3-wire communication link in different phases; and inverting a first bit of a 3-bit symbol corresponding to a transition of signaling state of the 3-wire communication link when the misalignment of the 3-wire communication link is determined to affect phase relationships between two or more signals carried on the 3-wire communication link, wherein inverting the first bit reverses an effect of the misalignment of the 3-wire communication link, and wherein determining presence of the misalignment of the 3-wire communication link further comprises determining that a receiver or a transmitter coupled to the 3-wire communication link has determined an incorrect direction of phase rotation between states of the 3-phase signal at the transition of signaling state of the 3-wire communication link.

2. The method of claim 1, wherein the 3-wire communication link is operated according to Mobile Industry Processor Interface (MIPI) Alliance 3-phase signaling protocols.

3. The method of claim 1, wherein the device receives the 3-phase signal from the 3-wire communication link, and wherein the first bit of the 3-bit symbol indicates direction of phase rotation between states of the 3-phase signal at the transition of signaling state of the 3-wire communication link.

4. The method of claim 1, wherein the device transmits the 3-phase signal over the 3-wire communication link, and wherein the first bit of the 3-bit symbol controls direction of phase rotation between states of the 3-phase signal at the transition of signaling state of the 3-wire communication link.

5. The method of claim 1, further comprising:
selecting a table used by a mapper based on whether the misalignment of the 3-wire communication link is determined to be present, wherein the 3-bit symbol is one of a sequence of symbols generated by the mapper, the sequence of symbols encoding data to be transmitted over the 3-wire communication link,
wherein the first bit in each symbol of the sequence of symbols is inverted in a first table that is selected when the misalignment of the 3-wire communication link is determined to affect phase relationships between the two or more signals, and
wherein the first bit in each symbol of the sequence of symbols is not inverted in a second table that is selected when the misalignment of the 3-wire communication link is determined not to affect phase relationships between the two or more signals.

6. The method of claim 1, further comprising:
selecting a table used by a demapper to decode data from a sequence of symbols received from the 3-wire communication link, wherein the table is selected from a plurality of tables based on whether the misalignment of the 3-wire communication link is determined to be present.

7. The method of claim 1, wherein determining the presence of the misalignment of the 3-wire communication link comprises:
receiving one or more sequences of symbols from the 3-wire communication link during a synchronization period; and
determining that the 3-wire communication link is properly aligned when one or more synchronization words are successfully decoded without inverting a rotation bit output by a demapper circuit.

8. The method of claim 1, wherein determining the presence of the misalignment of the 3-wire communication link comprises:
inverting the first bit in each symbol of a sequence of symbols received from the 3-wire communication link during synchronization of the 3-wire communication link; and
determining that the 3-wire communication link is misaligned when synchronization information is decoded from sequence of symbols while the first bit in each symbol of the sequence of symbols is inverted.

9. The method of claim 1, wherein the presence of the misalignment of the 3-wire communication link is determined from configuration information maintained by the device.

10. A system comprising:
means for transmitting a 3-phase signal on each of three wires of a 3-wire communication link in different phases, including an encoder that encodes data in transitions of signaling state of the three wires;
means for receiving the 3-phase signal from the 3-wire communication link;
means for determining presence of a misalignment of the 3-wire communication link involving two or more wires; and
means for correcting phase relationships between two or more signals carried on the three wires, including logic configured to invert a first bit of a 3-bit symbol corresponding to a transition in signaling state of the 3-wire communication link when the misalignment of the 3-wire communication link is determined to affect the phase relationships between the two or more signals,
wherein the first bit of the 3-bit symbol indicates a direction of phase rotation between states of the 3-phase signal at the transition of signaling state of the 3-wire communication link.

11. The system of claim 10, wherein the 3-wire communication link is operated according to a Mobile Industry Processor Interface (MIPI) Alliance 3-phase signaling protocol.

12. The system of claim 10, further comprising:
means for mapping data to sequences of 3-bit symbols, including a first table used by a mapper when the misalignment of the 3-wire communication link is determined to be present, and a second table used by the mapper when no misalignment of the 3-wire communication link is determined to be present.

13. The system of claim 10, further comprising:
means for decoding data from a sequence of symbols received from the 3-wire communication link, including a first table used by a demapper when the misalignment of the 3-wire communication link is determined to be present, and a second table used by the demapper when no misalignment of the 3-wire communication link is determined to be present.

14. The system of claim 10, further comprising means for detecting synchronization words received from the 3-wire communication link, including:
a first circuit configured to detect the synchronization words decoded from a sequence of symbols received from the 3-wire communication link during a synchronization period;
a second circuit that operates in a first mode to invert a first bit of each symbol in the sequence of symbols, wherein the first bit of each symbol is not inverted in a second mode; and
control logic that causes the second circuit to toggle between the first mode and the second mode until the first circuit detects the synchronization words.

15. An apparatus, comprising:
a communications interface configured to communicate data using a 3-phase signal transmitted in different phases on all three wires of a 3-wire communication link;
correction logic configured to correct phase relationships between two or more signals carried on the 3-wire communication link; and
a processing circuit configured to:
determine presence of a misalignment of the 3-wire communication link; and
cause the correction logic to invert a first bit of a 3-bit symbol corresponding to a transition of signaling state of the 3-wire communication link when the misalignment of the 3-wire communication link involving two or more wires is determined to affect the phase relationships between two or more signals carried on the 3-wire communication link, and the first bit of the 3-bit symbol indicates a direction of phase rotation between states of the 3-phase signal at the transition of signaling state of the 3-wire communication link.

16. The apparatus of claim 15, wherein the processing circuit is configured to:
select a table used to map data values to sequences of symbols based on whether the misalignment of the 3-wire communication link is determined to be present,
wherein the first bit in each symbol of the sequence of symbols is inverted in a first table that is selected when the misalignment of the 3-wire communication link is determined to affect phase relationships between the two or more signals, and
wherein the first bit in each symbol of the sequence of symbols is not inverted in a second table that is selected when the misalignment of the 3-wire communication link is determined not to affect phase relationships between the two or more signals.

17. The apparatus of claim 15, wherein the processing circuit is configured to determine the presence of the misalignment of the 3-wire communication link by:
toggling the first bit in each symbol of a sequence of symbols transmitted on the 3-wire communication link during synchronization of the 3-wire communication link until synchronization information is decoded from sequence of symbols.

18. The apparatus of claim 15, further comprising:
a storage device that maintains configuration information that indicates whether of the misalignment of the 3-wire communication link is present.

19. A non-transitory processor-readable storage medium having one or more instructions which, when executed by at least one processor of a processing circuit, cause the processing circuit to:
determine presence of a misalignment of a 3-wire communication link, involving two or more wires, by a receiver or a transmitter coupled to the 3-wire communication link, wherein a 3-phase signal is transmitted on all wires of the 3-wire communication link in different phases; and
invert a first bit of a 3-bit symbol corresponding to a transition of signaling state of the 3-wire communication link when the misalignment of the 3-wire communication link is determined to affect phase relationships between two or more signals carried on the 3-wire communication link, and indicates an incorrect direction of phase rotation between states of the 3-phase signal at the transition of signaling state of the 3-wire communication link
wherein inverting the first bit reverses an effect of the misalignment of the 3-wire communication link.

20. The processor-readable storage medium of claim 19, wherein the 3-wire communication link is operated according to Mobile Industry Processor Interface (MIPI) Alliance 3-phase signaling protocols.

21. The processor-readable storage medium of claim 19, wherein the 3-phase signal is received from the 3-wire communication link, and wherein the first bit of the 3-bit symbol indicates direction of phase rotation between states of the 3-phase signal at the transition of signaling state of the 3-wire communication link.

22. The processor-readable storage medium of claim 19, wherein the 3-phase signal is transmitted over the 3-wire communication link, and wherein the first bit of the 3-bit symbol controls direction of phase rotation between states of the 3-phase signal at the transition of signaling state of the 3-wire communication link.

23. The processor-readable storage medium of claim 19, wherein the one or more instructions cause the processing circuit to:
select a table used by a mapper based on whether the misalignment of the 3-wire communication link is determined to be present, wherein the 3-bit symbol is one of a sequence of symbols generated by the mapper, the sequence of symbols encoding data to be transmitted over the 3-wire communication link,
wherein the first bit in each symbol of the sequence of symbols is inverted in a first table that is selected when the misalignment of the 3-wire communication link is determined to affect phase relationships between the two or more signals, and
wherein the first bit in each symbol of the sequence of symbols is not inverted in a second table that is selected when the misalignment of the 3-wire communication link is determined not to affect phase relationships between the two or more signals.

24. The processor-readable storage medium of claim 19, wherein the one or more instructions cause the processing circuit to:
select a table used by a demapper to decode data from a sequence of symbols received from the 3-wire communication link, wherein the table is selected from a plurality of tables based on whether the 3-wire communication link is determined to be misaligned.

25. The processor-readable storage medium of claim 19, wherein the one or more instructions cause the processing circuit to:
receive one or more sequences of symbols from the 3-wire communication link during a synchronization period; and
determine that the 3-wire communication link is properly aligned when one or more synchronization words are successfully decoded without inverting a rotation bit output by a demapper circuit.

26. The processor-readable storage medium of claim 19, wherein the one or more instructions cause the processing circuit to:
invert the first bit in each symbol of a sequence of symbols received from the 3-wire communication link during synchronization of the 3-wire communication link; and
determine that the 3-wire communication link is misaligned when synchronization information is decoded from sequence of symbols while the first bit in each symbol is inverted.

27. The processor-readable storage medium of claim 19, wherein the presence of the misalignment of the 3-wire communication link is determined from configuration information maintained by the processing circuit.

* * * * *